US008535795B2

(12) United States Patent
Wegner et al.

(10) Patent No.: US 8,535,795 B2
(45) Date of Patent: *Sep. 17, 2013

(54) MULTI-LAYERED COATINGS, METHOD FOR THE PRODUCTION THEREOF, AND USE THEREOF IN THE CAR INDUSTRY

(75) Inventors: Egon Wegner, Greven (DE); Wolfgang Duschek, Muenster (DE); Thomas Krueger, Muenster (DE); Michael Richert, Emsdetten (DE); Katharina Fritzsche, Weil am Rhein (DE)

(73) Assignee: BASF Coatings GmbH, Munster (DE)

( * ) Notice: Subject to any disclaimer, the term of this patent is extended or adjusted under 35 U.S.C. 154(b) by 1009 days.

This patent is subject to a terminal disclaimer.

(21) Appl. No.: 11/908,848

(22) PCT Filed: Mar. 3, 2006

(86) PCT No.: PCT/EP2006/001929
§ 371 (c)(1),
(2), (4) Date: Aug. 6, 2009

(87) PCT Pub. No.: WO2006/097201
PCT Pub. Date: Sep. 21, 2006

(65) Prior Publication Data
US 2009/0317629 A1    Dec. 24, 2009

(30) Foreign Application Priority Data

Mar. 16, 2005 (DE) .......................... 10 2005 012 056

(51) Int. Cl.
*B32B 9/00* (2006.01)
*B05D 1/36* (2006.01)
*B05D 3/00* (2006.01)
*F21V 9/06* (2006.01)

(52) U.S. Cl.
USPC ........... 428/335; 428/334; 428/704; 252/589; 427/331; 427/402

(58) Field of Classification Search
None
See application file for complete search history.

(56) References Cited

U.S. PATENT DOCUMENTS

| | | | | |
|---|---|---|---|---|
| 5,260,361 A | * | 11/1993 | Fukushima et al. | ............ 524/98 |
| 5,278,314 A | * | 1/1994 | Winter et al. | ................. 548/259 |
| 5,296,519 A | * | 3/1994 | Otsuka | ............................ 524/94 |
| 5,436,349 A | | 7/1995 | Winter et al. | |
| 6,166,218 A | | 12/2000 | Ravichandran et al. | |
| 6,344,505 B1 | | 2/2002 | Valentine, Jr. et al. | |
| 6,703,139 B1 | * | 3/2004 | Ogawa et al. | ................. 428/500 |
| 7,695,643 B2 | * | 4/2010 | Fritzsche et al. | .............. 252/403 |

FOREIGN PATENT DOCUMENTS

| | | |
|---|---|---|
| DE | 2824418 A1 | 12/1978 |
| DE | 3636183 A1 | 3/1988 |
| DE | 4438504 A1 | 5/1996 |
| DE | 102004028368 A1 | 3/2005 |
| EP | 0228003 B1 | 7/1987 |
| EP | 0241476 B1 | 10/1987 |
| EP | 0543393 A1 | 5/1993 |
| EP | 0543817 B1 | 6/1993 |
| EP | 0574417 B1 | 12/1993 |
| EP | 0576527 B1 | 1/1994 |
| EP | 0576943 B1 | 1/1994 |
| EP | 0682680 B1 | 11/1995 |
| EP | 0787159 B1 | 8/1997 |
| EP | 0823289 B1 | 2/1998 |
| EP | 0920480 B1 | 6/1999 |
| EP | 0961797 B1 | 12/1999 |
| EP | 1308084 A1 | 5/2003 |
| WO | WO91/09917 A2 | 7/1991 |
| WO | WO01/25307 A1 | 4/2001 |
| WO | WO03/068418 A2 | 8/2003 |
| WO | WO2004/018580 A1 | 3/2004 |

OTHER PUBLICATIONS

International Preliminary Report on Patentability for International application No. PCT/EP2006/001929 dated Oct. 3, 2007.
International Search Report for PCT/EP2006/001929 dated Jun. 6, 2006.
Written Opinion for PCT/EP2006/001929 filed Mar. 16, 2005.

* cited by examiner

*Primary Examiner* — Monique Jackson
(74) *Attorney, Agent, or Firm* — Cantor Colburn LLP

(57) ABSTRACT

The present disclosure provides multicoat systems exhibiting ultraviolet (UV) stability after ultraviolet exposure and moisture exposure. The systems comprise at least one primer (G), at least one pigmented coating (P) disposed on a surface of the primer, and at least one ultraviolet (UV) absorber which has an absorption maximum of at least 370 nm. The pigmented coating (P) may be comprised of two or more coatings (P1), (P2) to (Pn). The multicoat systems may also comprise a transparent coating material (T) to form a transparent coating (K). The present multicoat systems demonstrate ultraviolet stability, reduced delamination of the pigmented coat from the primer and are available in a variety of shades for use in the finishing, refinishing and coating of component parts.
The present disclosure also provides for a process for producing the multicoat system, and provides for the use of the system.

18 Claims, No Drawings

MULTI-LAYERED COATINGS, METHOD FOR THE PRODUCTION THEREOF, AND USE THEREOF IN THE CAR INDUSTRY

CROSS-REFERENCE TO RELATED APPLICATIONS

This Application is a National Phase Application of Patent Application PCT/EP2006/001929 filed on 3 Mar. 2006, which claims priority to German patent application DE 10 2005 012 056.3 filed 16 Mar. 2005, both of which are hereby incorporated by reference.

FIELD OF THE INVENTION

The present invention relates to multicoat color and/or effect paint systems comprising at least one primer (G), at least one pigmented coating (P) disposed thereon, and, if desired, a transparent coating (K) disposed on the pigmented coating (P).

The invention further provides a process for producing the multicoat paint systems, and also provides for their use.

PRIOR ART

Multicoat paint systems used in the automotive original equipment manufacturer ("OEM") finishing sector nowadays consist in general of an electrophoretically applied primer, which protects against corrosion and stone chipping, and a subsequent surfacer coat, which protects against stone chipping and smoothens the surface. The surfacer coat is usually applied to the already-baked primer, and cured. An alternative possibility is to cure primer and surfacer coat jointly. Applied subsequently to the cured surfacer coat is a single-coat finish or a decorative two-coat finish composed of a color and/or effect basecoat, which is applied in one or more spray passes as a function of the respective shade, and a protective clearcoat, which is applied wet-on-wet to the basecoat. Subsequently the single-coat finish or the basecoat(s) and the clearcoat is or are jointly cured.

Increasingly, however, automakers are concerned to reduce the coat thicknesses of the paint system and also the number of operations and also, where appropriate, the number of coats, without any attendant deterioration in the performance profile of the multicoat paint systems, particularly any deterioration in UV stability.

Thus multicoat paint systems are known in which one or more basecoats are applied directly to an electrophoretically deposited primer. Atop the basecoat(s), where appropriate, a clearcoat is applied. Subsequently the basecoat(s) and, where appropriate, the clearcoat are jointly cured. This process omits the surfacer coat which is normally situated between cathodic EC and basecoat.

Where the surfacer coat is omitted it is necessary for the functions otherwise undertaken by the surfacer coat, such as stone-chip protection, surface smoothening, assistance with basecoat hiding power in the case of basecoat materials with low hiding power, prevention of delamination of the electrophoretically applied primer, and UV protection of the multicoat paint system, for example, to be undertaken by the remaining coats. Moreover, the properties of the multicoat paint system overall must not be impaired; in other words, for example, the corrosion control must not be impaired.

Finally, there exists, on the part of automakers, a keen requirement that the individual coats of a multicoat paint system should be able to be produced even using coating materials from different manufacturers, with, as far as possible, no problems.

EP-B-823 289 describes a process for producing the multicoat paint systems specified at the outset, in which two basecoat films are applied directly to an electrophoretically deposited and cured primer, and are themselves cured. Subsequently a transparent coating material is applied to the cured basecoat films and is itself cured. The first basecoat, by virtue of its pigmentation, with a dry film thickness of 30 µm, has a light transmittance, at a wavelength of 400 to 700 nm, of 5% or less.

A disadvantage associated with this process is the need to cure the basecoat films before the clearcoat is applied. A further disadvantage is the pigmentation needed in the first basecoat in order to achieve the low level of light transmittance, such pigmentation not being suitable for every desired shade of the multicoat paint system. Furthermore, the necessary pigmentation has a severe influence on the shade of the first basecoat; in the case of thin second basecoats, of 6 to 11 µm, for example, and the associated insufficient hiding power of the second basecoat, depending on shade, this can lead to great problems.

Further, DE-A-44 38 504 discloses a process for producing multicoat paint systems of the type specified at the outset, in which atop the primer, which is preferably applied electrophoretically, two different pigmented coatings and one transparent coating are applied, the first pigmented coating undertaking surfacer functions and comprising as its binder a specific polyurethane dispersion and also titanium dioxide as pigment and talc as filler. A disadvantage with this process, however, is, once again, the pigmentation of the basecoat(s) that is needed in order to achieve low levels of light transmittance. Furthermore, interim drying is necessary between the application of the first and second pigmented coatings, in order to improve the appearance.

Additionally, German patent application P 10 2004 028 368, not yet published, proposes, while omitting the surfacer coat, for the purpose of improving the UV stability of the multicoat paint system in question, using, in the first pigmented coating, not only at least one color and/or effect pigment but also at least one UV-absorbing pigment and talc.

Furthermore, WO 03/068418 also discloses multicoat paint systems of the type specified at the outset. The problems with regard to UV sensitivity of the primer that are associated with the omission of the surfacer coat, particularly delamination of the primer, are to be avoided, according to WO 03/068418, by the basecoat situated directly above the primer having a UV transmittance at 400 nm of not more than 5%. To this end the commercial light stabilizer Tinuvin® 1130, based on a UV absorber having an absorption maximum of 346 nm, is added to the basecoat. With this process too, however, depending on the pigmentation of the first basecoat, the UV stability of the multicoat paint system is not ensured or else it must be set by way of the pigmentation.

EP-B-576 527, moreover, discloses UV absorbers based on 5-thio-substituted benzotriazoles, which exhibit an absorption maximum which as compared with the UV absorbers known hitherto has been shifted into the longer-wave region, namely an absorption maximum of up to 367 nm. One of the recommended uses of these UV absorbers is for the UV protection of electrophoretically deposited primers. Even the use of these UV absorbers in the multicoat paint systems of the type specified at the outset, however, does not lead in all cases to adequate UV stability.

Finally, there are other UV absorbers known which are based on benzotriazoles and have an absorption maximum which has been shifted into the longer-wave range, such as the benzotriazoles substituted in position 5 by alkylsulfonyl groups, described in U.S. Pat. No. 5,436,349, or the benzotriazoles substituted in position 5 by $CF_3$ groups, described in U.S. Pat. No. 6,166,218. Even the use of these UV absorbers in the multicoat paint systems of the type specified at the outset, however, does not lead in all cases to adequate UV stability.

Problem

The problem on which the present invention was based was therefore to provide multicoat paint systems of the type specified at the outset which even after moisture exposure in the steam jet test on a St. Andrew's Cross (test conditions: time 60 sec, pressure 60 bar, distance 10 cm, temperature 67° C.) do not, on UV exposure, particularly on exposure for 6000 hours to the so-called WOM-CAM 180 Q/B test according to VDA [German Automakers Association] test bulletin (E) 621-430, April '97, and/or SAE J1960 JUN89 (referred to below for short as CAM 180 test), exhibit any delamination of the pigmented coat from the primer.

Furthermore, it ought to be possible to produce the multicoat paint systems in all of the automakers' desired shades and, insofar as a transparent coating is present, using the transparent coating materials that are already being used at present.

Additionally the multicoat paint systems ought to be able to be produced by means of a very simple and inexpensive process, and the thicknesses of the individual coats ought preferably to be as low as possible. Preferably, furthermore, the individual coats of the multicoat paint system ought to be able to be produced, with as far as possible no problems, even using coating materials from different manufacturers.

Finally, the multicoat paint systems ought to meet the requirements normally imposed on an automotive finish, but in particular ought to exhibit the requisite effective corrosion control and stone-chip protection.

Solution to the Problem

This problem is solved, surprisingly, by means of multicoat paint systems of the type specified at the outset which are characterized in that the pigmented coating (P) and/or the primer (G) comprise or comprises at least one UV absorber (UV1) which has an absorption maximum of at least 370 nm.

The present invention also provides a process for producing the multicoat paint system, and provides for their use.

Advantages of the Invention

It is surprising and was not foreseeable that through the inventive use of the UV absorbers (UV1) having an absorption maximum of at least 370 nm in the pigmented coat and/or in the primer multicoat paint systems are obtained which have adequate UV stability even after moisture exposure and do so even in the case of shades which have hitherto been critical—that is, in particular, even when the pigmented coatings do not contain any UV-absorbing pigments, such as carbon black and/or corresponding iron oxide pigments, for example.

Therefore, even on UV exposure, and in particular even after moisture exposure in the aforementioned steam jet test on a St. Andrew's cross under UV exposure, in particular on exposure for 6000 hours in the aforementioned CAM 180 test, the multicoat paint systems of the invention show no delamination of the pigmented coating from the primer.

Since the UV absorbers used have a much lesser influence on the shade of the coat to which they are added than the specific UV-absorbing pigments hitherto used for UV protection, the multicoat paint systems of the invention can be made available in all of the automakers' desired shades.

In this context, surprisingly, it is even possible to make the multicoat paint systems available in all desired shades when the second basecoat has only a very low sub-hiding coat thickness, preferably a coat thickness of 40% to 70% of the coat thickness which would be necessary in order to achieve hiding. It is therefore possible in accordance with the invention, for example, when using transparent coating materials, for the second basecoat to have a thickness of only 6 to 8 μm in the case of metallic finishes and of approximately 11 μm in the case of other, solid-color finishes, although, depending on the method of application that is used, higher coat thicknesses are also possible, although it is not necessary in terms of hiding and coloration.

Further, the multicoat paint systems of the invention have the advantage that they can be produced by means of an extremely simple and inexpensive process. It is also possible, moreover, to produce the individual coats of the multicoat paint system even using coating materials from different manufacturers.

Finally, the multicoat paint systems of the invention meet the requirements normally imposed on an automotive finish: that is, they have, in particular, the requisite effective corrosion control and stone-chip protection.

DETAILED DESCRIPTION OF THE INVENTION

Inventive Multicoat Paint Systems

The multicoat paint systems of the invention have at least one primer (G), at least one pigmented coating (P) disposed atop the primer, and also, if desired, a transparent coating (K) disposed atop the pigmented coating (P). Preferred multicoat paint systems in the context of the present invention, however, are those in which the pigmented coating (P) is composed of two or more pigmented coatings (P1) to (Pn), more preferably of two pigmented coatings (P1) and (P2).

It is essential to the invention that the primer (G) and/or the pigmented coating (P) or—in the case of multicoat paint systems comprising at least two pigmented coatings (P1) and (P2)—the pigmented coating (P1) and/or (P2) and/or (Pn) comprise or comprises at least one UV absorber (UV1) which has an absorption maximum of at least 370 nm, preferably at least 370 nm to 450 nm, more preferably of 375 to 450 nm, with particular preference of 378 nm to 440 nm, and very preferably of 378 to 420 nm.

Preferably the UV absorber (UV1) used in accordance with the invention also still exhibits, in the range from 300 to 400 nm, at least 50% of the absorption as compared with the absorption at the absorption maximum. With particular preference the UV absorber used in accordance with the invention also still exhibits, in the range from 405 to 420 nm, at least 10% of the absorption as compared with the absorption at the absorption maximum.

Preferably the pigmented coating(s) (P) and/or (P1) to (Pn) comprise or comprises the UV absorber (UV1) used in accordance with the invention.

On the basis of the intrinsic color of the UV absorber (UV1) used in accordance with the invention, having a UV absorption maximum of at least 370 nm, particular preference is given either to multicoat paint systems comprising two pigmented coatings, in which the lowermost pigmented coating (P1) comprises the UV absorber used in accordance with the invention, or to multicoat paint systems comprising more than two pigmented coatings, in which the lowermost pigmented coating (P1) and/or the lowermost pigmented coatings (P1) to (Pn−1) comprise or comprises the UV absorber (UV1) used in accordance with the invention.

Very particular preference is given to multicoat paint systems comprising at least one primer (G), a first pigmented coating (P1) disposed thereon, a second pigmented coating (P2) disposed atop the first pigmented coating (P1), and a transparent coating (K) disposed atop the pigmented coating (P2), the first pigmented coating (P1) comprising the UV absorber (UV1) which has an absorption maximum of at least 370 nm.

Preferably, furthermore, either one or more UV absorbers (UV1) having an absorption maximum of at least 370 nm are used which do not migrate into the adjacent coats, in particular not into the transparent coating (K), so as, in particular, to prevent shade problems. If necessary, therefore, UV absorbers can be used which have been immobilized by methods familiar to the skilled worker.

Examples of suitable UV absorbers (UV1) which have an absorption maximum of at least 370 nm are, for example, UV absorbers from the class of the substituted hydroxyphenyl-benzotriazoles, the wavelength range of the absorption maximum being controlled by the type and position of the substituents on the benzotriazoles.

Preference is given to using substituted hydroxyphenyl-benzotriazoles which have the following structure:

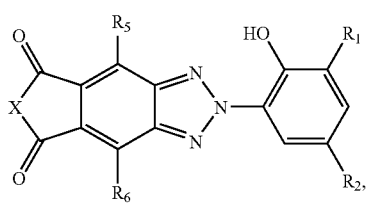

(I)

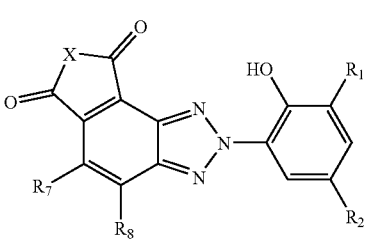

(II)

where $R_1$ is hydrogen, a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, or a phenyl radical, or this phenyl radical or this phenylalkyl radical can be substituted on the phenyl ring by 1 to 4 alkyl groups having 1 to 4 carbon atoms; or where $R_1$ is a group

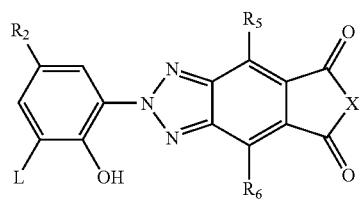

or a group

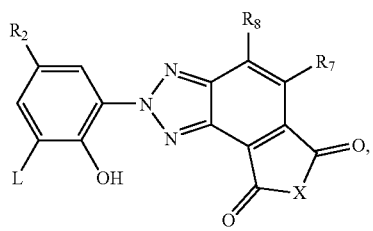

where L is an alkylene radical having 1 to 12 carbon atoms, an alkylidene radical having 2 to 12 carbon atoms, a benzylidene radical, a p-xylene radical or a cycloalkylene radical having 5 to 7 carbon atoms;

$R_2$ is a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, or a phenyl radical, or this phenyl radical or this phenylalkyl radical can be substituted on the phenyl ring by 1 to 3 alkyl groups having 1 to 4 carbon atoms; or where this alkyl radical can be substituted by one or more —OH, —OCO—$R_{11}$, —O$R_{14}$, —NCO or —NH$_2$ groups or mixtures thereof, or where this alkyl or alkenyl radical can be interrupted by one or more —O—, —NH— or —N$R_{14}$— groups or mixtures thereof, and they can be unsubstituted or substituted by one or more —OH, —O$R_{14}$ or —NH$_2$ groups or mixtures thereof; where $R_{11}$ is hydrogen, a branched or unbranched alkyl radical having 1 to 18 carbon atoms, a $C_5$-$C_{12}$ cycloalkyl radical, a branched or unbranched alkenyl radical having 3 to 8 carbon atoms or a phenyl, naphthyl or $C_7$-$C_{15}$ phenylalkyl radical; and $R_{14}$ is hydrogen or a branched or unbranched alkyl radical having 1 to 24 carbon atoms; or $R_2$ is —O$R_{14}$, a group —C(O)—O—$R_{14}$, —C(O)—NH$R_{14}$ or —C(O)—N$R_{14}$R'$_{14}$, where R'$_{14}$ has the same definition as $R_{14}$; or $R_2$ is —S$R_{13}$, —NH$R_{13}$ or —N($R_{13}$)$_2$; or $R_2$ is —(CH$_2$)$_m$—CO—$X_1$-(Z)$_p$—Y—$R_{15}$, where $X_1$ is —O— or —N($R_{16}$)—, Y is —O— or —N($R_{17}$)— or a direct bond, Z is $C_2$-$C_{12}$ alkylene, $C_4$-$C_{12}$ alkylene interrupted by one or more nitrogen atoms, oxygen atoms or a mixture thereof, or is $C_3$-$C_{12}$ alkylene, butenylene, butynylene, cyclohexylene or phenylene, it being possible for each of these radicals to be additionally substituted by an OH group or by a group

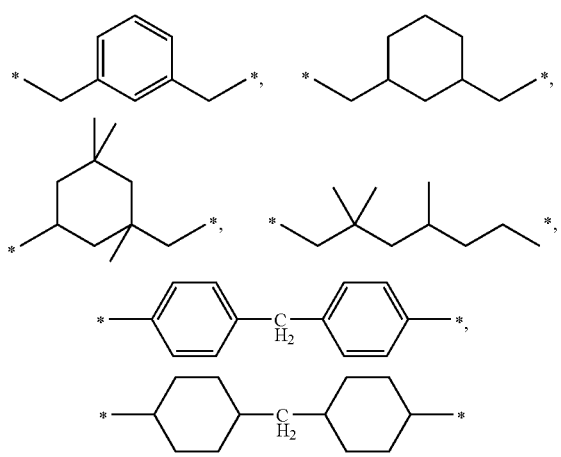

where * denotes a bond or, if Y is a direct bond, Z as well can also be a direct bond;

m is 0, 1 or 2, p is 1, or p is 0 if X and Y are each $-N(R_{16})-$ and $-N(R_{17})-$, $R_{15}$ is hydrogen, $C_1$-$C_{12}$ alkyl, or a group

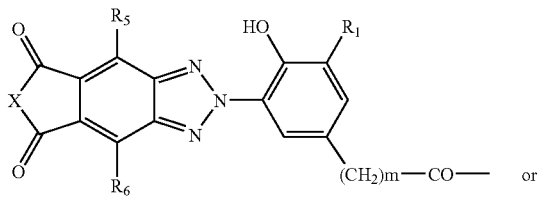

or a group $-CO-C(R_{18})=C(H)R_{19}$ or, if Y is $-N(R_{17})-$, it forms together with $R_{17}$ a group $-CO-CH=CH-CO-$, where $R_{18}$ is hydrogen or methyl, and $R_{19}$ is hydrogen, methyl or $-CO-X_1-R_{20}$, where $R_{20}$ is hydrogen, $C_1$-$C_{12}$ alkyl or a group of the formula

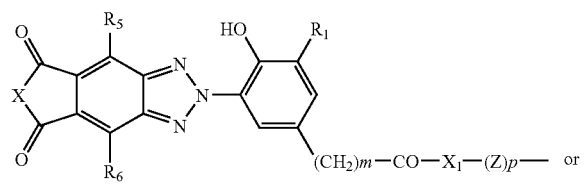

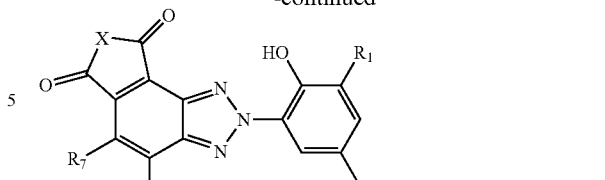

$R_5$, $R_6$, $R_7$ and $R_8$ are each independently of one another hydrogen, halogen, CN, $NO_2$ or $NH_2$, $R_{13}$ is alkyl having 1 to 20 carbon atoms, hydroxyalkyl having 2 to 20 carbon atoms, alkenyl having 3 to 18 carbon atoms, cycloalkyl having 5 to 12 carbon atoms, phenylalkyl having 7 to 15 carbon atoms, or phenyl or naphthyl both of which may be substituted by one or two alkyl radicals having 1 to 4 carbon atoms;

$R_{16}$ and $R_{17}$ are independently of one another hydrogen, $C_1$-$C_{12}$ alkyl, $C_3$-$C_{12}$ alkyl interrupted by 1 to 3 oxygen atoms, or cyclohexyl or $C_7$-$C_{15}$ phenylalkyl, and $R_{16}$ together with $R_{17}$ can also be ethylene if Z is ethylene;

X is O or $NE_1$, where $E_1$ is hydrogen, a branched or unbranched alkyl radical having 1 to 24 carbon atoms, a branched or unbranched alkenyl radical having 2 to 18 carbon atoms, a $C_2$-$C_6$ alkynyl, a $C_5$-$C_{12}$ cycloalkyl, phenyl, naphthyl or $C_7$-$C_{15}$ phenylalkyl; or this branched or unbranched alkyl radical having 1 to 24 carbon atoms, this branched or unbranched alkenyl radical having 2 to 24 carbon atoms, this $C_2$-$C_6$ alkynyl can be substituted by one or more $-F$, $-OH$, $-OR_{22}$, $-NH_2$, $-NHR_{22}$, $-N(R_{22})_2$, $-NHCOR_{23}$, $-NR_{22}COR_{23}$, $-OCOR_{24}$, $-COR_{25}$, $-SO_2R_{26}$, $-PO(R_{27})_n(R_{28})_{2-n}$, $-Si(R_{29})_n(R_{30})_{3-n}$, $-Si(R_{22})_3$, $-N^+(R_{22})_3$ $A^-$, $-S^+(R_{22})_2$ $A^-$, -oxiranyl groups or mixtures thereof; or this branched or unbranched alkyl radical having 1 to 24 carbon atoms, this branched or unbranched alkenyl radical having 2 to 24 carbon atoms, this $C_2$-$C_6$ alkynyl can be interrupted by one or more $-O-$, $-S-$, $-NH-$ or $-NR_{22}-$ groups or combinations thereof;

these phenyl, naphthyl or $C_7$-$C_{15}$ phenylalkyl radicals can also be substituted by one or more -halogen, $-CN$, $-CF_3$, $-NO_2$, $-NHR_{22}$, $-N(R_{22})_2$, $-SO_2R_{26}$, $-PO(R_{27})_n(R_{28})_{2-n}$, $-OH$, $-OR_{22}$, $-COR_{25}$ or $-R_{25}$ radicals, where n is 0, 1 or 2;

$R_{22}$ is a branched or unbranched alkyl radical having 1 to 18 carbon atoms, a branched or unbranched alkenyl radical having 2 to 18 carbon atoms, a $C_5$-$C_{10}$ cycloalkyl, phenyl or naphthyl, $C_7$-$C_{15}$ phenylalkyl, or are two $R_{22}$ radicals, if adjacent to a nitrogen or silicon atom, and together with the atom to which they are connected can form a pyrrolidine, piperidine or morpholine ring;

$R_{23}$ is hydrogen, $OR_{22}$, $NHR_{22}$, $N(R_{22})_2$ or has the same definition as $R_{22}$, $R_{24}$ is $OR_{22}$, $NHR_{22}$, $N(R_{22})_2$ or has the same definition as $R_{22}$, $R_{25}$ is hydrogen, OH, $OR_{22}$, $NHR_{22}$ or $N(R_{22})_2$, O-glycidyl or has the same definition as $R_{22}$, $R_{26}$ is OH, $OR_{22}$, $NHR_{22}$ or $N(R_{22})_2$, $R_{27}$ is $NH_2$, $NHR_{22}$ or $N(R_{22})_2$, $R_{28}$ is OH or $OR_{22}$, $R_{29}$ is $C_1$ or $OR_{22}$, $R_{30}$ is branched or unbranched $C_1$-$C_{18}$ alkyl; or $E_1$ is a group

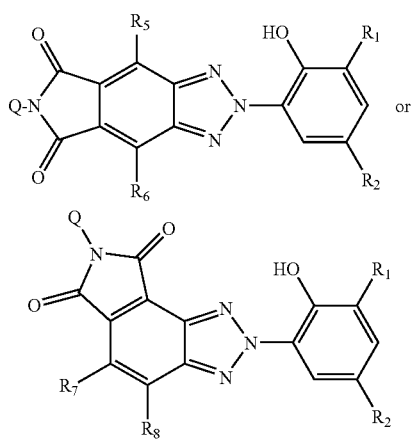

where
R$_1$ to R$_8$ are as defined above and
Q is branched or unbranched C$_2$-C$_{12}$ alkylene, C$_2$-C$_{12}$ alkylene which is interrupted by one or more —O—, NH or NR$_{14}$ atoms, C$_5$-C$_{10}$ cycloalkylene, para-phenylene or a group

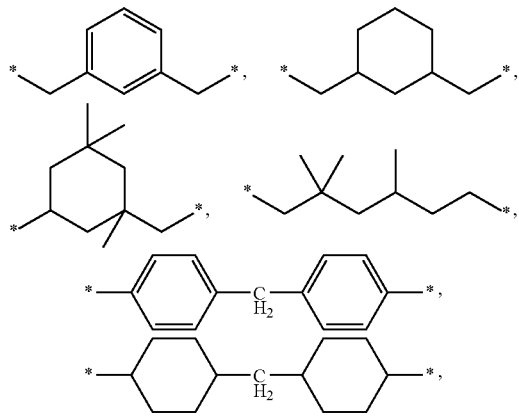

where * denotes a bond.

Halogen is, for example, fluorine, chlorine, bromine or iodine, preferably chlorine.

Branched or unbranched alkyl radicals having 1 to 24 carbon atoms are, for example, methyl, ethyl, isopropyl, n-butyl, isobutyl, sec-butyl, tert-butyl, tert-amyl, 2-ethylhexyl, tert-octyl, lauryl, tert-dodecyl, tridecyl, n-hexadecyl, n-octadecyl or eicosyl radicals.

Branched or unbranched alkenyl radicals having 2 to 18 carbon atoms are, for example, allyl, pentenyl, hexenyl, dodecenyl or oleyl radicals. Preference is given to alkenyl radicals having 3 to 16, particularly 3 to 12 and very preferably 2 to 6 carbon atoms.

Cycloalkyl having 5 to 12 carbon atoms is, for example, cyclopentyl, cyclohexyl, cycloheptyl, cyclooctyl and cyclododecyl radicals.

C$_1$-C$_4$ alkyl-substituted C$_5$-C$_8$ cycloalkyl is, for example, methylcyclo-pentyl, dimethylcyclopentyl, methylcyclohexyl, dimethylcyclohexyl, trimethylcyclohexyl or tert-butylcyclohexyl radicals.

Examples of phenylalkyl having 7 to 15 carbon atoms are benzyl, phenylethyl, α-methylbenzyl or α,α-dimethylbenzyl radicals.

Examples of alkyl-substituted phenyl are tolyl and xylyl radicals.

Alkyl substituted by one or more —O— groups and/or substituted by one or more —OH groups can be, for example, —(OCH$_2$CH$_2$)$_w$OH or —(OCH$_2$CH$_2$)$_w$O(C$_1$-C$_{24}$alkyl) with was 1 to 12.

Alkyl interrupted by one or more —O— may derive from ethylene oxide units or from propylene oxide units or from mixtures of both.

In the case of alkyl interrupted by —NH— or —NR$_{14}$—, the radicals are derived in the same way as for the —O— interrupted radicals described above, preference being given to repeating units of ethylenediamine. Examples are CH$_3$—O—CH$_2$CH$_2$—, CH$_3$—NH—CH$_2$CH$_2$—, CH$_3$—N(CH$_3$)—CH$_2$—, CH$_3$—O—CH$_2$CH$_2$—O—CH$_2$CH$_2$—, CH$_3$—(O—CH$_2$CH$_2$—)$_2$O—CH$_2$CH$_2$—, CH$_3$—(O—CH$_2$CH$_2$—)$_3$O—CH$_2$CH$_2$— or CH$_3$—(O—CH$_2$CH$_2$—)$_4$O—CH$_2$CH$_2$—.

Alkylene is, for example, ethylene, tetramethylene, hexamethylene, 2-methyl-1,4-tetramethylene, hexamethylene, octamethylene, deca-methylene and dodecamethylene.

Cycloalkylene is, for example, cyclopentylene, cyclohexylene, cyclo-heptylene, cyclooctylene and cyclododecylene, preferably cyclohexylene.

Alkylene interrupted by oxygen, NH or —NR$_{14}$— is, for example, —CH$_2$CH$_2$—O—CH$_2$CH$_2$—, —CH$_2$CH$_2$—NH—CH$_2$CH$_2$—, —CH$_2$CH$_2$—N(CH$_3$)—CH$_2$CH$_2$—, —CH$_2$CH$_2$—O—CH$_2$CH$_2$—O—CH$_2$CH$_2$—, —CH$_2$CH$_2$—(O—CH$_2$CH$_2$—)$_2$O—CH$_2$CH$_2$—, —CH$_2$CH$_2$—(O—CH$_2$CH$_2$—)$_3$O—CH$_2$CH$_2$—, —CH$_2$CH$_2$—(O—CH$_2$CH$_2$—)$_4$O—CH$_2$CH$_2$— or —CH$_2$CH$_2$—NH—CH$_2$CH$_2$—.

The radical Q is unbranched or branched C$_1$-C$_{12}$ alkylene, C$_5$-C$_{10}$ cycloalkylene, para-phenylene or a group

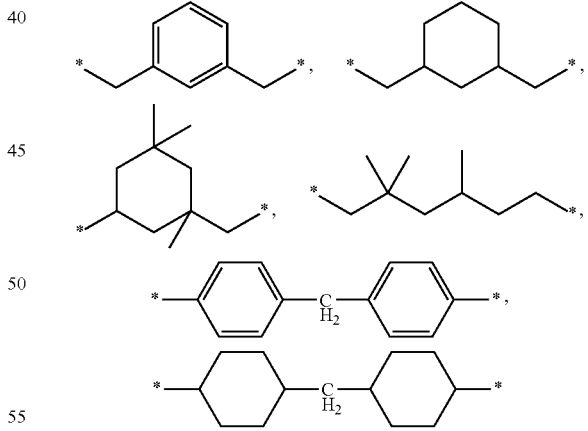

where * denotes a bond.

The radical can be obtained from readily available diamines, examples being the amines available commercially under the name Jeffamine. Examples of diamines are ethylenediamine, propylenediamine, 2-methyl-1,5-pentamethylenediamine, isophoronediamine or 1,2-diaminocyclo-hexane.

In the same way the radical Z can be derived from the same diamines or from the corresponding diols.

Typical Jeffamines are, for example, D-2000

where x=33.1 or ED-2003

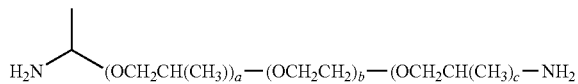

where a+c=5 and b=39.5.

It is preferred to use UV absorbers (UV1) of the formulae (I) and (II), where
$R_1$ is hydrogen, unbranched or branched alkyl having 1 to 12 carbon atoms or phenylalkyl having 7 to 15 carbon atoms;
$R_2$ is hydrogen, unbranched or branched alkyl having 1 to 12 carbon atoms or phenylalkyl having 7 to 15 carbon atoms or phenyl, or this phenyl radical or this phenylalkyl radical can be substituted on the phenyl ring by 1 to 3 alkyl groups having 1 to 4 carbon atoms;
$R_5$ and $R_6$ are hydrogen or one or both are Cl or Br;
$R_7$ and $R_8$ are, independently of one another, hydrogen, Cl or Br;
X is O or $NE_1$, where
$E_1$ is hydrogen, unbranched or branched alkyl having 1 to 6 carbon atoms which is unsubstituted or substituted by 1 to 4 OH, phenyl which is unsubstituted or substituted by F, $CF_3$, CN or Cl, or $C_7$-$C_9$ phenylalkyl.

Particular preference is given to using absorbers (UV1) having the following formula (1b) or (2c)

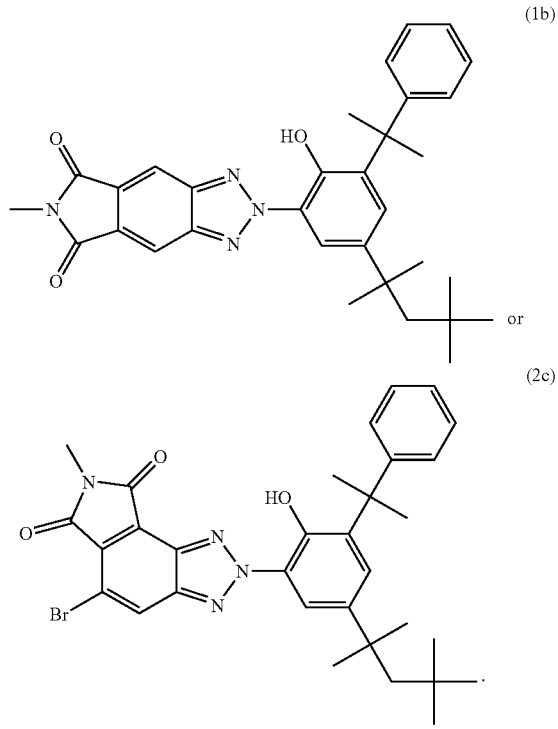

Also suitable is the trial product sold by Ciba Spezialitätenchemie Holding AG Schweiz under the name Tinuvin® CGL 957, a UV absorber developed on a substituted hydroxyphenylbenzotriazole having a UV absorption maximum of 380 nm. This UV absorber Tinuvin® CGL 957 also exhibits, in the entire range from 300 to 405 nm, an absorption of more than 50% of the absorption at 380 nm, and in the range from 405 to 420 nm exhibits an absorption of more than 10% of the absorption at 380 nm.

Surprisingly, and in contradistinction to the pigments used to date for UV protection, the use of the UV absorbers (UV1) used in accordance with the invention in the respective coats leads only to a slight change in shade of the respective coat. In the case of multicoat paint systems comprising two or more pigmented coatings in which the lowermost pigmented coating (P1) and/or the lowermost pigmented coatings (P1) to (Pn−1) comprise or comprises the UV absorber (UV1) used in accordance with the invention, therefore, the difference in shade between (P1) and (P2) or between (Pn−1) and (Pn) is only small. Hence in order to achieve a defined target shade, the uppermost pigmented coat (P2) or (Pn) must not be applied in a hiding coat thickness.

The uppermost pigmented coat (P2) or (Pn) may therefore have only a very low coat thickness below hiding, preferably a coat thickness of 40% to 70% of the coat thickness which would be necessary in order to achieve hiding, although, depending on the application method used, higher coat thicknesses are also possible, although it is not necessary in terms of hiding or coloration.

It is therefore possible, for example, in accordance with the invention, that when using transparent coating materials the second pigmented coat has a coat thickness of only 6 to 8 µm in the case of metallic finishes and of approximately 11 µm in the case of other, solid-color finishes.

In the case of the pigments used to date in UV protection, in contrast, the change in the shade of the respective coat is much greater, so that it may be necessary for the uppermost pigmented coat (P2) or (Pn) to be applied, preferably, hidingly or else at least in a coat thickness of generally more than 70% of the coat thickness which would be necessary in order to obtain hiding power. The resultant high coat thicknesses, in turn, can lead to problems with popping or else may necessitate a change of application techniques.

Besides the inventive UV absorbers (UV1) having an absorption maximum of at least 370 nm, the primer (G) and/or the pigmented coating (P) or the pigmented coating (P1) and/or (P2) and/or (Pn) may also comprise further light stabilizers, especially other UV absorbers (UV2), different from (UV1), and/or sterically hindered amines (HALS) and/or antioxidants. Examples of suitable further light stabilizers are described, for example, in EP-B-576 527, page 7, line 22, to page 10, line 8, in EP-A-1 308 084, page 2, line 15, to page 20, line 40, and in Kittel, Lehrbuch der Lacke und Beschichtungen, Volume III, Verlag W. A. Colomb in der Heenemann GmbH, 1976, pages 367 to 375.

Examples of further UV absorbers (UV2), used if desired, are UV absorbers which have an absorption maximum of less than 370 nm, preferably an absorption maximum of 280 nm to less than 370 nm.

Suitable UV absorbers, therefore, are, for example, the known UV absorbers based on substituted 2-hydroxyphenylbenzotriazoles and/or on hydroxyphenyltriazines, such as, for example, 5-thio-substituted 2-hydroxyphenylbenzotriazoles, 5-chloro-substituted 2-hydroxyphenylbenzotriazoles, trisaryl-s-triazines, such as, for example, 2-(2H-benzotriazol-2-yl)cresol, 2-(2-hydroxy-5-t-octyl phenyl)benzotriazole, 2-(2H-benzotriazol-2-yl)-4,6-bis(1,1-dimethylethyl)phenol,
2-(2H-benzotriazol-2-yl)-4,6-bis(1-methyl-1-phenylethyl) phenol,
2-(2H-benzotriazol-2-yl)-4,6-di-tert-pentylphenol,
2-(2H-benzotriazol-2-yl)-4,6-bis( )phenol,
isooctyl 3-(3-(2H-benzotriazol-2-yl)-5-tert-butyl-4-hydroxyphenyl-propionate,
octyl 3-(3-tert-butyl-4-hydroxy-5-(5-chloro-2H-benzotriazol-2-yl)phenyl)propionate,
2-(5-chloro-2H-benzotriazol-2-yl)-6-(1,1-dimethylethyl)-4-methylphenol, and a mixture of a-3-(3-(2H-benzotriazol-2-yl)-5-tert-butyl-4-hydroxy-phenyl)propionyl-j-hydroxypoly(oxyethylene) and a-3-(3-(2H-benzo-triazol-2-yl)-5-tert-butyl-4-hydroxyphenyl)propionyloxypoly (oxyethylene).

Suitable UV absorbers are also described, for example, in EP-B-576 527, page 2, line 47, to page 4, line 56 and page 9, lines 26 to 46, in EP-B-682 680, page 3, line 33, to page 7, line 11, in EP-A-1 308 084, page 2, line 13, to page 16, line 45, and in U.S. Pat. No. 6,166,218, column 23, line 12, to column 25, line 23.

Suitable UV absorbers which have an absorption maximum of less than 370 nm are also available commercially, such as, for example, Tinuvin® 1130, Tinuvin® 109, Tinuvin® 171, Tinuvin® 384, Tinuvin® 326, Tinuvin® 328, Tinuvin® 320, Tinuvin® 234, Tinuvin® P, Tinuvin® 405, Tinuvin® 400, Tinuvin® R 796, and CGL 479 from Ciba Spezialitätenchemie Holding AG Schweiz.

Examples of suitable light stabilizers based on sterically hindered amines are also, for example, the light stabilizers described in EP-B-576 943, pae 3, line 9, to page 5, line 18, in EP-A-1 308 084, page 19, line 47, to page 20, line 22, and those described in EP-B-576 527 on page 9, lines 47 to 56. Suitable light stabilizers based on sterically hindered amines are also available commercially, such as, for example, Tinuvin® 123, Tinuvin® 292, Tinuvin® 144 and Tinuvin® 152 from Ciba Spezialitätenchemie Holding AG Schweiz.

Examples of suitable antioxidants are alkylated monophenols, alkylthio-methylphenols, hydroquinones and alkylated hydroquinones, hydroxylated thiodiphenyl ethers, alkylidenebisphenols, aromatic hydroxybenzyl components, triazine components, esters of beta(3,5-di-tert-butyl-4-hydroxyphenyl)propionic acid, esters of beta(5-tert-butyl-4-hydroxy-3-methylphenyl)propionic acid, acylaminophenols and the like, examples being the antioxidants described in EP-B-576 527 on page 7, line 24, to page 9, line 25, in EP-A-1 308 084, page 16, line 55, to page 19, line 3, and in U.S. Pat. No. 6,166,218, column 21, line 37, to column 23, line 11.

The primer (G) and/or the pigmented coating (P) and/or (P1) and/or (P2) and/or (Pn) preferably comprise or comprises the UV absorber (UV1) or—in the case of a mixture of two or more UV absorbers—the UV absorbers (UV1) having an absorption maximum of at least 370 nm in an amount of 0.1% to 30.0%, preferably 0.5% to 20.0%, and more preferably in an amount of 0.5% to 15.0%, by weight, based in each case on the solids content of the primer (G) or on the solids content of the pigmented coating material.

The primer (G) and/or the pigmented coating (P) and/or (P1) and/or (P2) and/or (Pn) preferably comprise or comprises the further light stabilizers in an amount of 0 to 20.0%, preferably 0 to 12.0%, and more preferably in an amount of 0.1% to 10.0% by weight, based in each case on the solids content of the primer (G) or on the solids content of the pigmented coating material.

Primer (G)

Primers suitable for producing the multicoat paint system of the invention are all commonly employed primers, particularly primers normally used for coating metallic substrates. Where the multicoat paint systems of the invention are used to coat other substrates, such as plastics, for example, the coating compositions customary for priming those substrates are used.

The primers used particularly for steel and similar metals are usually aqueous coating materials having a solids content of generally 10% to 25% by weight. They generally include at least one binder, at least one crosslinking agent, pigments if desired, and further customary auxiliaries and additives, if desired. Preference is given to using electrophoretically depositable coating materials, known as electrocoat materials, particularly cathodically depositable electrocoat materials, as primer. Suitability is also possessed, however, by, for example, primers which can be applied by means of the technique known as coil coating. For substrates of aluminum the primers (G) used generally comprise aluminum oxide layers produced by anodic oxidation.

The electrocoat materials comprise binders which carry ionic substituents or substituents which can be converted into ionic groups, and also carry groups capable of chemical crosslinking. The ionic groups may be anionic groups or groups which can be converted into anionic groups, COOH groups for example, or cationic groups or groups which can be converted into cationic groups, examples being amino, ammonium, quaternary ammonium, phosphonium and/or sulfonium groups. Preference is given to using binders containing basic groups, especially nitrogen-containing basic groups. These groups may be in quaternized form or are converted into ionic groups with customary neutralizing agents, examples being organic monocarboxylic acids, such as formic, acetic or lactic acid, for example.

Suitable anodically depositable electrocoat materials are known and are described for example in DE-A-28 24 418. They usually include self-crosslinking or externally crosslinking binders based on polyesters, epoxy resins, poly (meth)acrylates, maleate oils or polybutadiene oils which carry anionic groups, such as —COOH, —SO$_3$H and/or —PO$_3$H$_2$ groups, and also customary crosslinkers, such as triazine resins, blocked polyiso-cyanates or crosslinkers which carry transesterifiable groups, for example.

Suitable cathodically depositable electrocoat materials are likewise known and are described for example in EP-B 0 241 476, WO 91/09917, EP-B-0 920 480, EP-B 0 961 797, WO2003/068418 and WO2004/018580. They usually include self-crosslinking or externally crosslinking binders based on polyesters, epoxy resins, epoxy resins having terminal double bonds or OH groups, poly(meth)acrylates, polyurethane resins or polybutadiene resins which carry cationic groups, such as primary, secondary or tertiary amino groups, which have been neutralized with an organic acid, and also include customary crosslinkers, such as triazine resins, blocked polyisocyanates, amino resins, polyepoxide compounds or crosslinkers which carry transesterifiable groups or double bonds, for example.

Preference is given to using the cathodically depositable electrocoat materials described in EP-B-0 961 797, which comprise an aqueous binder dispersion based on epoxy resins which contain ammonium groups and are obtainable by (I) reacting one or more diepoxy resins (a) with one or more mono- and/or diphenols (b) to give an intermediate (I),
(II) reacting the intermediate (I) with one or more amines to give an epoxide-amine adduct (A),
(III) subsequently or simultaneously reacting the secondary hydroxyl groups formed during the reaction of (a) and (b) with the epoxide groups of the epoxide-amine adduct (A), (IV) adding at least one crosslinking agent,
(V) neutralizing, and
(VI) dispersing the resulting mixture in water.

Pigmented Coatings (P), (P1), (P2) to (Pn)

The pigmented coatings (P), (P1), (P2) to (Pn) used in accordance with the invention may have been prepared using either aqueous or solventborne coating materials (B), which in general are curable physically or thermally and/or with actinic radiation. The coating materials (B) customarily comprise
(I) one or more solvents and/or water,
(II) one or more binders, preferably one or more polyurethane resins and/or acrylate resins and/or polyester resins, more preferably at least one polyurethane resin,
(III) if desired, at least one crosslinking agent,
(IV) one or more pigments,
(V) if desired, the UV absorber (UV1) used in accordance with the invention and having an absorption maximum of at least 370 nm, and
(VI) if desired, one or more customary auxiliaries and additives.

Suitable binders here are the polyurethane resins, acrylate resins, and polyester resins which are customarily employed in basecoat materials in the field of the automotive industry, the properties and hence the suitability of the binders for the process of the invention being controlled, in a way which is known to the skilled worker, via the selection of the nature and amount of the synthesis components used for preparing these binders.

Used with preference are polyurethane resins, in combination where appropriate with one or more polyacrylate resins and/or with one or more polyester resins.

The polyurethane resins are obtained in a manner which is known to the skilled worker, by reacting
at least one polyol selected from the group consisting of polyesterpolyols and polyetherpolyols, preferably having a number-average molecular weight of 400 to 5000, and
at least one polyisocyanate, and also
if desired, at least one compound containing at least one isocyanate-reactive functional group and at least one (potentially) anionic group in the molecule,
if desired, at least one further compound containing at least one isocyanate-reactive functional group, and
if desired, at least one compound with a number-average molecular weight of 60 to 600 daltons, containing hydroxyl and/or amino groups in the molecule,
and, in the case of the polyurethane resins used for aqueous coating materials, neutralizing the resultant reaction product. Polyurethane resins of this kind are described for example in EP-B-228 003 and EP-B-574 417.

Polyurethane resins of this kind are obtained, for example, by using as the isocyanate component isocyanates that are commonly used in the field of the paints industry, such as, for example, hexamethylene diisocyanate, octamethylene diisocyanate, decamethylene diisocyanate, dodecamethylene diisocyanate, tetradecamethylene diisocyanate trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato-1-methylcyclo-hexane, diisocyanates derived from dimer fatty acids, as sold under the trade designation DDI 1410 by Henkel, 1,8-diisocyanato-4-isocyanato-methyloctane, 1,7-diisocyanato-4-isocyanatomethylheptane or 1-isocyanato-2-(3-isocyanatopropyl)cyclohexane or tetramethylxylylene diisocyanates (TMXDI) or mixtures of these polyisocyanates, preferably tetramethylxylylene diisocyanates (TMXDI) and/or isophorone diisocyanate, preferably isophorone diisocyanate.

As chain extenders with hydroxyl and/or amino groups it is preferred to use trimethylolpropane and diethanolamine.

Suitable binders in the pigmented coating materials, together with or instead of the stated polyurethane resins, are also what are called acrylated polyurethane resins, which are obtainable, in a manner known to the skilled worker, by polymerizing ethylenically unsaturated monomers in the presence of a polyurethane resin. In this context it is possible to use polyurethane resins without double bonds and/or polyurethane resins with double bonds.

As binders it is particularly preferred to use acrylated polyurethane resins having pendant and/or terminal double bonds, in particular having pendant and/or terminal ethenylarylene groups.

The acrylated polyurethane resins having pendant and/or terminal double bonds can be obtained by reacting a polyurethane prepolymer (I-1) containing at least one free isocyanate group with a compound (I-2) which contains at least one ethylenically unsaturated double bond and one group that is reactive toward NCO groups, in particular a hydroxyl group or an amino group.

The acrylated polyurethane resins having pendant and/or terminal double bonds can also be obtained by reacting a polyurethane prepolymer (II-1) containing at least one group that is reactive toward NCO groups, in particular at least one hydroxyl group or one amino group, with a compound (II-2) which contains at least one ethylenically unsaturated double bond and one free isocyanate group.

Binders used with particular preference are, furthermore, graft copolymers obtainable by polymerizing olefinically unsaturated monomers in the presence of the acrylated polyurethane resins having pendant and/or terminal double bonds.

Use is made in particular of graft copolymers which have a hydrophobic core comprising at least one copolymerized olefinically unsaturated monomer and a hydrophilic shell comprising at least one hydrophilic acrylated polyurethane. Also suitable, however, are graft copolymers which comprise a hydrophobic core comprising at least one hydrophobic acrylated polyurethane and a hydrophilic shell comprising at least one copolymerized olefinically unsaturated monomer.

Suitable acrylated polyurethane resins and also graft copolymers prepared from them are described for example in WO 01/25307, page 5, line 14, to page 45, line 4, and in EP-B-787 159, page 2, line 27, to page 7, line 13.

The polyurethane resins described can be used where appropriate in combination with one or more polyacrylate resins and/or with one or more polyester resins.

Suitable polyester resins can be saturated or unsaturated, especially saturated, and generally have a number-average molecular weight of 400 to 5000, and are described for example in EP-B-787 159, page 4, lines 26 to 53.

The amount of binder in the coating material (B) is generally 10% to 99%, preferably 30% to 90% by weight, based in each case on the solids content of the coating material (B).

The amount of crosslinking agent in the coating material (B) is generally 0 to 55%, preferably 5% to 40%, by weight, based in each case on the solids content of the coating material (B).

As crosslinking agents, used where appropriate, the pigmented coating materials comprise, in particular, free isocyanates or blocked isocyanates and/or amino resins.

Suitable isocyanate in this context comprises principally the isocyanates referred to in connection with the description of the polyurethane resins and commonly used in the area of the paints industry, preferably TACT and dimethylpyrazole-blocked trimeric hexamethylene diisocyanate, and also, in the case of the two-component coating materials, trimeric hexamethylene diisocyanate.

Suitable blocking agents include all commonly employed blocking agents, such as the corresponding alcohols, amines, ketones, pyrazoles, etc., preferably blocking agents having a deblocking temperature less than 130° C.

Amino resins suitable in principle are those which are commonly used in the area of the paints industry, the properties of the pigmented coating materials being controllable via the reactivity of the amino resins. Preference is given to using butanol-etherified amino resins, an example being the commercially available Cymel® 203.

The pigmented coating material may further comprise, if desired, crosslinked microparticles, as are described, for example, in EP-A-543 817. They can be used in particular for controlling the flow and the evaporation behavior.

The pigmented coating material further comprises at least one pigment. Preferably the pigment is selected from the group consisting of organic and inorganic, color, effect, color and effect, magnetically shielding, electrically conductive, corrosion-inhibiting, fluorescent, and phosphorescent pigments. Preference is given to using the color and/or effect pigments.

Examples of suitable effect pigments, which may also impart color, are metal flake pigments, such as commercially customary aluminum bronzes, aluminum bronzes chromated in accordance with DE 36 36 183 A1, and commercially customary stainless steel bronzes, and also nonmetallic effect pigments, such as, for example, pearlescent pigments and interference pigments, platelet-shaped effect pigments based on iron oxide or liquid-crystalline effect pigments. For further details refer to Römpp Lexikon Lacke und Druckfarben, Georg Thieme Verlag, 1998, pages 176, >>Effect pigments<< and pages 380 and 381, >>Metal oxide-mica pigments<< to >>Metal pigments<<.

Suitable organic and/or inorganic color pigments are the pigments commonly employed in the paints industry.

The amount of the pigments in the coating material (B) may vary very widely and is guided primarily by the depth of color and/or the intensity of the effect that are to be set, and also by the dispersibility of the pigments in the coating materials (B). In the case of solid-color paints the pigment content, based in each case on the solids content of the coating material (B), is preferably 0.5% to 70%, more preferably 1.0% to 60%, by weight. In the case of metallic paints, again based in each case on the solids content of the coating material (B), the pigment content is preferably 0.5% to 40%, more preferably 0.5% to 35%, and very preferably 1% to 30%, by weight.

Besides the above-described pigments, the coating materials (B) and/or (B1) to (Bn) may comprise conventional auxiliaries and additives, such as organic and inorganic, transparent and hiding fillers, and nanoparticles, and also further customary auxiliaries and additives, in customary amounts, preferably 0 to 40% by weight, based on the coating material (B).

In the case of a multicoat pigmented coating it is possible for the coat (P1) to comprise further additives in comparison to the subsequent pigmented coats (P2) to (Pn), particularly additives for obtaining surfacer properties, such as elastomeric particles, talc and the like, for example.

As already stated in connection with the description of the multicoat paint systems above, the pigmented coating material(s) preferably comprises or comprise the UV absorber (UV1) used in accordance with the invention and having an absorption maximum of at least 370 nm.

Transparent Coating Material (T) for Producing the Transparent Coating (K)

Transparent coating materials suitable for producing the multicoat paint system of the invention are all commonly employed transparent coating materials, such as, for example, commonly employed aqueous or solventborne transparent coating materials, which may be formulated either as one-component materials or else as two-component or multicomponent coating materials. Also suitable, furthermore, are powder slurry clearcoat materials. The transparent coating materials used may be curable thermally and/or by means of radiation, in particular by means of UV radiation.

The transparent coating materials customarily comprise at least one binder containing functional groups and also at least one crosslinker having a functionality which is complementary to the functional groups of the binder. Examples of such complementary functionalities are, in particular, carboxyl/epoxy, amine or thiol or hydroxyl/blocked or free isocyanate or alkoxylated amino groups or transesterifiable groups, (meth)acryloyl/CH-acidic or amine or hydroxyl or thiol, carbamate/alkoxylated amino groups, and (meth)acryloyl/(meth)acryloyl.

Use is made in particular of transparent coating materials based on polyurethane resins and/or polyacrylate resins and/or polyester resins, preferably with hydroxyl, amino, carbamate, carboxyl, (meth)acryloyl and/or thiol groups, in combination with the corresponding crosslinkers, particularly in combination with isocyanates, amino resins, anhydrides, and the like.

Besides the binder and crosslinker, the transparent coating materials comprise customary auxiliaries and additives, such as, for example, crosslinking catalysts, defoamers, adhesion promoters, additives for improving substrate wetting, additives for improving surface smoothness, matting agents, light stabilizers, preferably the above-described UV absorbers having an absorption maximum below 370 nm and/or HALS, corrosion inhibitors, biocides, flame retardants or polymerization inhibitors, as described in the book "Lackadditive" [Additives for coatings] by Johan Bieleman, Wiley-VCH, Weinheim, N.Y., 1998, in detail.

Process for Producing the Multicoat Paint System

The multicoat paint system of the invention can be applied to any desired substrates. The substrates may be composed of any of a very wide variety of materials and combinations of materials. Preferably they consist of metals, plastics, glass, wood, leather, textile, ceramic or natural stone, preferably of metals, plastics, and glass, in particular of metals and plastics.

The primer is applied with the usual techniques, such as dipping, knifecoating, spraying, rolling or the like, but in particular by means of electrodeposition coating. Preferably the primer is at least partly, or completely, cured before the pigmented coating material or materials is or are applied. The primer is cured usually by heating to a temperature between 80 and 170° C. for a time from 3 to 30 minutes.

The transparent coating material (T), where applied, is applied, like the pigmented coating material (B), by means of customary techniques for applying liquid coating materials, such as, for example, dipping, knifecoating, spraying, rolling or the like, but in particular by means of spraying.

In the case of multicoat paint systems with more than one pigmented coating material (B1) to (Bn), the lower pigmented coating material or the lower pigmented coating materials (Bn−1) is or are applied advantageously by means of electrostatic spray application (ESTA), preferably with high-speed rotating bells, and the upper pigmented coating composition (B2) or (Bn) is applied by means of pneumatic spray application.

In the case of multicoat paint systems with more than one pigmented coating material, the lower pigmented coating material (B1) or all lower coats are advantageously each coated immediately with the next pigmented coating material (B2) or (B3), etc., up to (Bn), without drying between application of the individual pigmented coating materials. In contrast to the conventional techniques, therefore, it is possible to omit a separate drying station, such as a blowing tunnel, for example, on the paint line.

Depending on the configuration of the painting plant employed, therefore, it is possible for all of the pigmented coats to be applied without flash-off inbetween. It is nevertheless preferred to operate with a short flash-off, preferably at ambient temperature of generally <30° C., for a time of <3 minutes, in particular with a flash-off dependent on the particular plant, such as by means of the above-described use of two separate application stations.

It is, furthermore, also possible to carry out drying or partial curing between the application of the individual pigmented coatings.

Where a transparent coating material (T) as well is applied, preferably the pigmented coating (P) or the pigmented coatings (P1) to (Pn) is or are briefly flashed off or briefly dried, generally at a temperature between 30 and less than 100° C., for a time of 1 to 15 min. Thereafter the transparent coating material is applied.

The applied coats (P1), (P2) to (Pn) and, where appropriate, (K) are jointly thermally cured. Where the transparent coating material (T) is also curable with actinic radiation as well, an aftercure is also performed by exposure to actinic radiation. If the primer (G) used, where appropriate, has not yet cured, it is cured as well in this step of the process.

Curing may take place after a certain rest time. This time may have a duration of 30 seconds to 2 hours, preferably 1 minute to 1 hour, and in particular 1 to 45 minutes. The rest time serves, for example, for the flow and devolatilization of the coating films or for the evaporation of volatile constituents. The rest time can be assisted and/or shortened through the use of elevated temperatures up to 90° C. and/or through a reduced air humidity<10 g of water/kg of air, provided that this does not entail any damage or alteration to the coating films, such as premature complete crosslinking, for instance.

Curing is performed usually at a temperature between 90 and 160° C. for a time of 15 to 90 minutes.

For the drying and/or conditioning of the wet pigmented coatings (P) or (P1) to (Pn) and also, where appropriate, of the wet transparent coating (K) it is preferred to use thermal and/or convection techniques, in which case conventional apparatus is employed, such as tunnel ovens, NIR and IR heat lamps, fans, and blowing tunnels. These types of apparatus can also be combined with one another.

Within the multicoat paint systems of the invention the primer (G) generally has a dry film thickness of 8 to 60 μm, preferably of 10 to 40 μm, and—if present—the transparent coating (K) generally has a dry film thickness of 8 to 80 μm, preferably of 10 to 70 μm, in particular 10 to 60 μm.

In the case of the multicoat paint systems with only one pigmented coating (P) the coating (P) generally has a dry film thickness of 6 to 100 μm, preferably of 8 to 80 μm, and in particular 10 to 60 μm.

In the case of the multicoat paint systems with two pigmented coatings (P1) and (P2) the pigmented coating (P1) generally has a dry film thickness of 6 to 40 μm, preferably of 6 to 30 μm, in particular of 8 to 25 μm, and/or the pigmented coating (P2) has a dry film thickness of 3 to 40 μm, preferably of 3 to 30 μm, in particular of 3 to 20 μm.

The second basecoat may have only a very low, sub-hiding coat thickness, preferably a coat thickness of 40% to 70% of the coat thickness which would be needed to obtain hiding. It is therefore possible in accordance with the invention, for example, when using transparent coating materials, for the second basecoat to have a coat thickness of only 6 to 8 μm in the case of metallic finishes and of approximately 11 μm in the case of other, solid-color finishes, although higher coat thicknesses are also possible, depending on the method of application that is used, despite the fact that it is not necessary in terms of the hiding power or the coloration.

Where the multicoat paint systems of the invention comprise a transparent coating (K), the dry film thickness of the pigmented coating (P) or of the pigmented coatings (P1) and (P2) is generally lower than when there is no transparent coating (K). In that case, preferably, the pigmented coating (P1) has a dry film thickness of 6 to 25 μm, preferably of 8 to 16 μm, and/or the pigmented coating (P2) has a dry film thickness of 3 to 20 μm, preferably of 3 to 10 μm.

Use of the Multicoat Paint System

The multicoat paint systems of the invention are employed in particular in the sector of automotive OEM finishing, but also in the sectors of commercial-vehicle finishing and automotive refinishing, and are used for coating motor vehicle bodies or interior body components or exterior body components. They are also suitable, however, for other sectors, such as for the coating of components for marine and aircraft construction or of components for household and electrical appliances or parts thereof, for example.

EXAMPLES 1.1. Preparation of Pigment Pastes PP1 to PP3

Pigment paste PP1 is obtained by initially introducing, in accordance with table 1 below, the polyurethane dispersion from EP-B-787 159, page 8, polyurethane dispersion B, and adding, with rapid stirring, polypropylene glycol, blue Paliogenblau L 6482 pigment, deionized water, and a neutralizing solution (dimethylethanolamine, 10% in water). The stirring time amounts to one hour. After stirring, the mixture is ground with a commercially customary laboratory mill until the fineness, measured according to Hegman, is <12 μm. To conclude, the formulation is adjusted to a pH of 7.8-8.2 using the neutralizing solution (dimethylethanolamine, 10% in water).

TABLE 1

| | |
|---|---|
| Polyurethane dispersion | 66.5 |
| Polypropylene glycol | 1.7 |
| Deionized water | 13.9 |
| Blue Paliogenblau L6482 pigment | 16.5 |
| Neutralizing solution | 1.4 |

Pigment paste PP2 is obtained by initially introducing, in accordance with table 2 below, the polyurethane dispersion from EP-B-787 159, page 8, polyurethane dispersion B, and the polyester from EP-B-787 159, page 8, polyester resin solution A, and adding, with rapid stirring, polypropylene glycol, butyl diglycol, Russ FW2 carbon black pigment, deionized water, and a neutralizing solution (dimethylethanolamine, 10% in water). The stirring time amounts to one hour. After stirring, the mixture is ground with a commercially customary laboratory mill until the fineness, measured according to Hegman, is <12 μm. To conclude, the formulation is adjusted to a pH of 7.8-8.2 using the neutralizing solution (dimethylethanolamine, 10% in water).

TABLE 2

| Polyurethane dispersion | 58.9 |
| --- | --- |
| Polyester | 5 |
| Polypropylene glycol | 2.2 |
| Butyldiglycol | 7.6 |
| Deionized water | 8.4 |
| Russ FW2 carbon black | 10.1 |
| Neutralizing solution | 7.8 |

Pigment paste PP3 is obtained by initially introducing, in accordance with table 3 below, the polyurethane dispersion from EP-B-787 159, page 8, polyurethane dispersion B, and adding, with rapid stirring, polypropylene glycol, butyl diglycol, pink Hostapermrosa E pigment, deionized water, and a neutralizing solution (dimethylethanolamine, 10% in water). The stirring time amounts to one hour. After stirring, the mixture is ground with a commercially customary laboratory mill until the fineness, measured according to Hegman, is <12 μm. To conclude, the formulation is adjusted to a pH of 7.8-8.2 using the neutralizing solution (dimethylethanolamine, 10% in water).

TABLE 3

| Polyurethane dispersion | 45.2 |
| --- | --- |
| Polypropylene glycol | 2.6 |
| Butyl diglycol | 6.3 |
| Deionized water | 21.3 |
| Pink Hostapermrosa E | 24 |
| Neutralizing solution | 0.6 |

1.2. Preparation of the Light Stabilizer Having an Absorption Maximum of More than 370 Nm

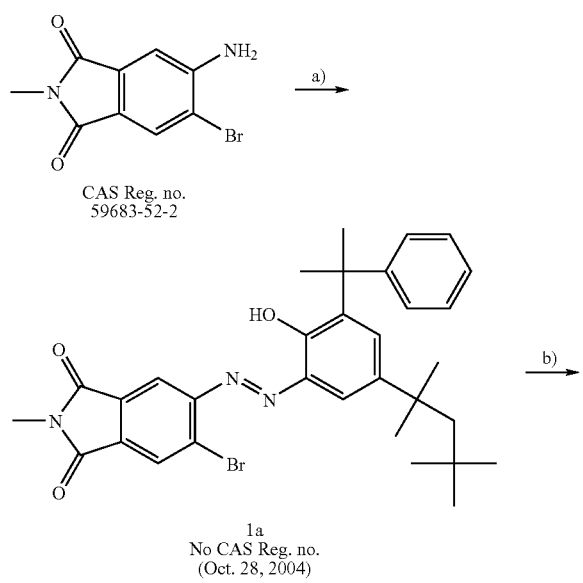

1a
No CAS Reg. no.
(Oct. 28, 2004)

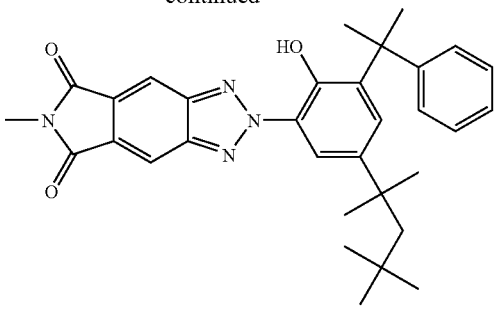

1b a) Nitrosylsulfuric acid (40% in sulfuric acid; 14.0 g, 44.1 mmol) is added slowly at 15° C. to a stirred suspension of 4-amino-5-bromophthalimide (95%; 10.7 g, 39.9 mmol) in acetic acid (200 ml). During the addition the temperature is maintained at between 15° C. and 17° C. by means of an icebath. When addition is complete (45 minutes), stirring is continued for 2 hours. The reaction mixture is then transferred to a dropping funnel and added slowly at 15° C. to a stirred solution of 2-cumyl-4-t-octylphenol (95%; 13.7 g, 40.1 mmol) in methanol/m-xylene (85/15 parts by volume; 200 ml) containing NaOH microprills (1.8 g, 45.0 mmol) and sodium acetate (13.1 g, 159.7 mmol). During the addition the temperature is maintained at between −15° C. and −9° C. by means of an isopropanol/tri ice bath. The pH is measured using an electrode and held at 5 by addition of NaOH (30% in water; in total 250 ml). When the addition is complete (2 hours; initial pH 13.7, final pH 5.6), the ice bath is removed and the resulting suspension is stirred overnight. Water (150 ml) and toluene (250 ml) are added, and the water phase is separated off and washed with toluene (1×250 ml). The combined organic phases are washed with water (2×250 ml), dried ($MgSO_4$), and filtered and the solvent is removed. This gives 30 g of a red oil. Methanol (60 g) is added and the suspension is heated to boiling at reflux. As a result of cooling (ice bath), component 1a crystallizes out as a red solid, which is filtered, washed with methanol, and dried. Yield 16.2 g (27.4 mmol, 68.8%).

Melting point: 178-179° C.

$^1$H NMR (300 MHz, $CD_2Cl_2$), β (ppm): 13.14 (s, 1H), 8.34 (s, 1H), 8.18 (s, 1H), 7.92 (d-like, 1H), 7.76 (d-like, 1H), 7.28-7.24 (m, 4H), 7.20-7.15 (m, 1H), 3.20 (s, 3H), 1.87 (s, 2H), 1.82 (s, 6H), 1.51 (s, 6H), 0.86 (s, 9H).

b) A stirred mixture of component 1a (17.2 g, 29.1 mmol), sodium azide (99%; 2.5 g, 38.1 mmol) and 1-methyl-2-pyrrolidinone (60 ml) is heated to 120° C. The temperature is maintained until the evolution of nitrogen is at an end and stops (1.5 hours). The dark solution is cooled to 25° C. and then water (100 ml) and toluene (150 ml) are added. The aqueous phase is separated off and washed with toluene (1×50 ml). The combined organic phases are washed with water (3×50 ml), dried ($MgSO_4$), and filtered, and the solvent is removed. Leaving the system to stand produces 17 g of a viscous red oil. This crude material is dissolved in hot toluene. Hexane is added and, in the course of cooling, component 1b crystallizes out as a yellow solid, which is filtered off and dried (8 g). The filtrate is concentrated by evaporation and the residue crystallizes out from hexane and provides a further 3.5 g of component 1b. Yield 11.5 g (21.9 mmol, 75.3%).

Melting point: 198-199° C.

¹H NMR (300 MHz, CD$_2$Cl$_2$), β (ppm): 10.97 (s, 1H), 8.40-8.39 (m, 3H), 7.76 (d-like, 1H), 7.31-7.24 (m, 4H), 7.20-7.15 (m, 1H), 3.25 (s, 3H), 1.91 (s, 2H), 1.83 (s, 6H), 1.54 (s, 6H), 0.86 (s, 9H).

1.3. Preparation of the Aqueous Metallic Basecoat Material 1

25.0 parts of a paste of a synthetic sodium-magnesium silicate with sheet structure, from Laporte (3% in water), are introduced initially and are admixed with stirring in succession with
22.0 parts of a polyurethane dispersion from EP-B-787 159, page 8, polyurethane dispersion B,
1.3 parts of a polyester resin solution from EP-B-787 159, page 8, polyester resin solution A,
3.3 parts of butyl glycol,
4.8 parts of a commercial melamine resin in butanol (Maprenal VMF3924),
0.3 part of a neutralizing solution (dimethylethanolamine, 10% in water),
4.0 parts of a polyurethane-modified polyacrylate from EP-B-787 159, pages 8 and 9, polyacrylate D,
2.7 parts of isopropanol,
2.4 parts of ethylhexanol,
6.0 parts of deionized water,
1.2 parts of a 1:1 mixture of a polyurethane thickener from Henkel (Nopco DSX 1550) with butyl glycol,
7.3 parts of deionized water,
4.0 parts of the pigment paste PP1, based on 66.5% by weight of polyurethane dispersion B and 16.5% by weight of blue Paliogenblau L6482,
1.6 parts of the pigment paste PP2, based on 58.9% by weight of polyurethane dispersion B, 5% by weight of polyester, and 10.1% by weight of Farbruβ FW2 carbon black,
2.8 parts of pigment paste PP3, based on 45.2% by weight of polyurethane dispersion B and 24.0% by weight of pink Hostaperm-Rosa E, and
2.0 parts of deionized water.
Added to this mixture with stirring is a mixture consisting of
0.9 part of a polyester resin solution from EP-B-787 159, page 8, polyester resin solution A,
0.9 part of butyl glycol, and
0.9 part of the pigment Mearlin EXT. Super Violett 539Z, and the combined mixture is diluted with 3.1 parts of deionized water.
The aqueous basecoat material prepared in this way is adjusted with deionized water to a viscosity of 80-100 mPas at 1000 s$^{-1}$ and with a 10% strength aqueous dimethylethanolamine solution to a pH of 7.7-8.0.

1.4. Preparation of the Aqueous Metallic Basecoat Material 2

Before being adjusted with deionized water and aqueous dimethyl-ethanolamine solution, the aqueous metallic basecoat material 1 prepared in example 1.3. is admixed with 2%, based on the total weight of basecoat material 2, of Tinuvin® 1130 from Ciba Spezialitätenchemie Holding AG Schweiz.

1.5. Preparation of the Inventive Aqueous Metallic Basecoat Material 3

Before being adjusted with deionized water and aqueous dimethyl-ethanolamine solution, the aqueous metallic basecoat material 1 prepared in example 1.3. is admixed with 2%, based on the total weight of basecoat material 2, of inventive UV absorber 1b described in example 1.2.

1.6. Production of Multicoat Paint Systems 1 to 3

For the testing of the adhesion after accelerated weathering by means of the steam jet test on a St. Andrew's Cross, the aqueous basecoat materials 1-3 were applied at a dry film thickness of 12 μm to test panels consisting of a steel substrate (bodywork panel) which had been coated with a conventional, cathodically deposited and baked electrocoat (Cathoguard® 500 from BASF Coatings, dry film thickness 20 μm), predried at 80° C. for 10 minutes, cooled, and overcoated with a commercial two-component polyurethane clearcoat (EverGloss from BASF Coatings AG, dry film thickness 35 μm). Thereafter the resultant aqueous basecoat film 1 or 2 or 3, respectively, and clearcoat film were baked at 130° C. for 30 minutes.

The resultant multicoat paint systems 1 to 3 were investigated for adhesion by means of the steam jet test on a St. Andrew's Cross (test conditions: time 60 sec, pressure 60 bar, distance 10 cm, temperature 67° C.) with UV exposure, in particular with exposure for 6000 hours in the so-called WOM-CAM 180 Q/B test in accordance with VDA [German Automakers Association] test bulletin (E) 621-430, April '97, and/or SAE J1960 JUN89.

Test Results:

| Steam jet adhesion after | ABC 1 Multicoat paint system 1 | ABC 2 Multicoat paint system 2 | ABC 3 Multicoat paint system 3 |
| --- | --- | --- | --- |
| a) 3000 h CAM 180 | 5* | 0 | 0 |
| b) 4000 h CAM 180 | 5* | 0 | 0 |
| c) 5000 h CAM 180 | 5* | 5* | 0 |
| d) 6000 h CAM 180 | 5* | 5* | 0 |

0 = no damage
5* = total delamination of the basecoat from the electrocoat

The inventive multicoat paint system 3 with the inventive aqueous basecoat material 3 is the only one to meet the test conditions and shows no damage at all.

1.7. Production of Multicoat Paint Systems 4 to 6

A steel substrate (bodywork panel) was provided with a conventional, cathodically deposited and baked electrocoat (Cathoguard® 500 from BASF Coatings, dry film thickness 20 μm). Atop the resultant electrocoat were applied aqueous basecoat materials 1-3 (dry film thickness 10 μm), flashed off at room temperature for 2 minutes and overcoated with a second application of aqueous basecoat material 1 (dry film thickness 5 μm), then predried at 80° C. for 10 minutes and cooled. To conclude, the system is overcoated with a commercial two-component polyurethane clearcoat (EverGloss® from BASF Coatings AG (dry film thickness 35 μm). Thereafter the resultant aqueous basecoat film 4 or 5 or 6, respectively, and clearcoat film were baked at 130° C. for 30 minutes.

The resultant multicoat paint systems 4 to 6 were investigated for adhesion by means of the steam jet test on a St. Andrew's Cross (test conditions: time 60 sec, pressure 60 bar, distance 10 cm, temperature 67° C.) with UV exposure, in particular with exposure for 6000 hours in the so-called WOM-CAM 180 Q/B test in accordance with VDA [German Automakers Association] test bulletin (E) 621-430, April '97, and/or SAE J1960 JUN89.

Test Results:

| Steam jet adhesion after | ABC1 + ABC1 Multicoat paint system 4 | ABC2 + ABC1 Multicoat paint system 5 | ABC3 + ABC1 Multicoat paint system 6 |
|---|---|---|---|
| a) 3000 h CAM 180 | 5* | 0 | 0 |
| b) 4000 h CAM 180 | 5* | 0 | 0 |
| c) 5000 h CAM 180 | 5* | 5* | 0 |
| d) 6000 h CAM 180 | 5* | 5* | 0 |

0 = no damage
5* = total delamination of the basecoat from the electrocoat

The inventive aqueous basecoat material 6 is the only one to meet the test conditions and shows no damage at all.

What is claimed is:

1. A multi-layered coating comprising:
   at least one primer (G); and
   at least one pigmented coating (P) disposed on the at least one primer (G),
   wherein at least one of the pigmented coating (P) and the primer (G) comprise at least one UV absorber (UV1) having an absorption maximum of at least 370 nm and comprising at least one of formula (I) and formula (II),

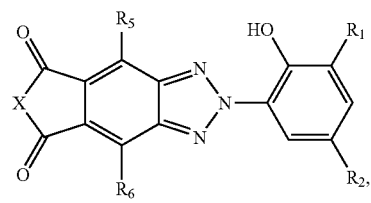

(I)

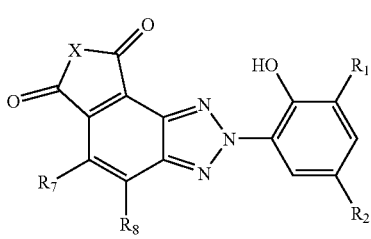

(II)

wherein $R_1$ is selected from the group consisting of hydrogen, a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, a phenyl radical, a phenylalkyl radical substituted on a phenyl ring by 1 to 4 alkyl groups having 1 to 4 carbon atoms, a group of the formula

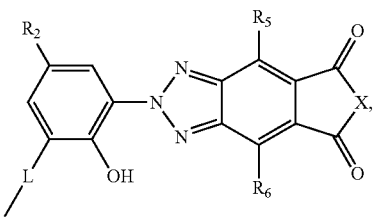

and a group of the formula

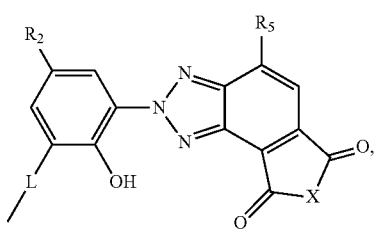

wherein

L comprises at least one divalent radical selected from the group consisting of an alkylene radical having 1 to 12 carbon atoms, an alkylidene radical having 2 to 12 carbon atoms, and a benzylidene radical, a p-xylene radical, and a cycloalkylene radical each having 5 to 7 carbon atoms;

$R_2$ is selected from the group consisting of a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, a phenyl radical, $-OR_{14}$, $-C(O)-O-R_{14}$, $-C(O)-NHR_{14}$, $-C(O)-NR_{14}R'_{14}$, (wherein $R'_{14}$ has the same definition as $R_{14}$), $-SR_{13}$, $-NHR_{13}$, $-N(R_{13})_2$, and $-(CH_2)_m-CO-X_1-(Z)_p-Y-R_{15}$, wherein, with respect to $R_2$, (i) one or more of the phenyl and phenylalkyl radical can be substituted on the phenyl ring by 1 to 3 alkyl groups having 1 to 4 carbon atoms; (ii) the alkyl radical can be substituted by one or more groups selected from the group consisting of $-OH$, $-OCO-R_{11}$, $-OR_{14}$, $-NCO$, $-NH_2$, and mixtures thereof; (iii) one or more of the alkyl or alkenyl radical can be interrupted by one or more groups selected from the group consisting of $-O-$, $-NH$, $-NR_{14}-$ and mixtures thereof; or (iv) one or more of the alkyl radical and alkenyl radical can be substituted by at least one of $-OH$, $-OR_{14}$, $-NH_2$, and mixtures thereof, $R_{11}$ is selected from the group consisting of hydrogen, a branched or unbranched alkyl radical having 1 to 18 carbon atoms, a $C_5$-$C_{12}$ cycloalkyl radical, a branched or unbranched alkenyl radical having 3 to 8 carbon atoms, a phenyl radical, a naphthyl radical, and a $C_7$-$C_{15}$ phenylalkyl radical, $R_{13}$ is at least one selected from the group consisting of alkyl having 1 to 20 carbon atoms, hydroxyalkyl having 2 to 20 carbon atoms, alkenyl having 3 to 18 carbon atoms, cycloalkyl having 5 to 12 carbon atoms, phenylalkyl having 7 to 15 carbon atoms, substituted or unsubstituted phenyl radical, and substituted or unsubstituted naphthyl radical, $R_{14}$ is selected from the group consisting of hydrogen, and a branched or unbranched alkyl radical having 1 to 24 carbon atoms, $X_1$ is selected from the group consisting of —O— and —N($R_{16}$)—, Y is selected from the group consisting of —O—, —N($R_{17}$)—, and a direct bond, $R_{15}$ is selected from the group consisting of hydrogen, $C_1$-$C_{12}$ alkyl,

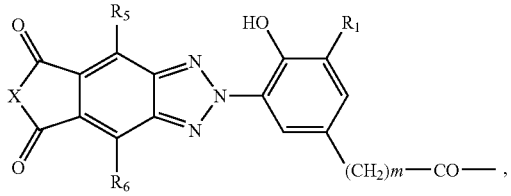

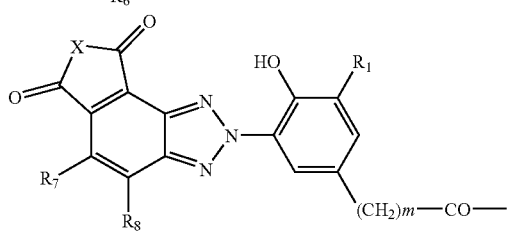

and —CO—C($R_{18}$)=C(H)$R_{19}$ or, if Y is —N($R_{17}$)—, $R_{15}$ forms together with $R_{17}$ a group —CO—CH=CH—CO—, $R_{16}$ and $R_{17}$ are independently of one another selected from the group consisting of hydrogen, $C_1$-$C_{12}$ alkyl, $C_3$-$C_{12}$ alkyl interrupted by 1 to 3 oxygen atoms, and cyclohexyl and $C_7$-$C_{15}$ phenylalkyl, and $R_{16}$ together with $R_{17}$ can also be ethylene if Z is ethylene;

$R_{18}$ is at least one of hydrogen and methyl, $R_{19}$ is selected from the group consisting of hydrogen, methyl and —CO—$X_1$—$R_{20}$, wherein $R_{20}$ is selected from the group consisting of hydrogen, $C_1$-$C_{12}$ alkyl, a group of the formula

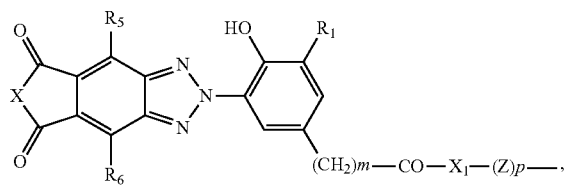

and a group of the formula

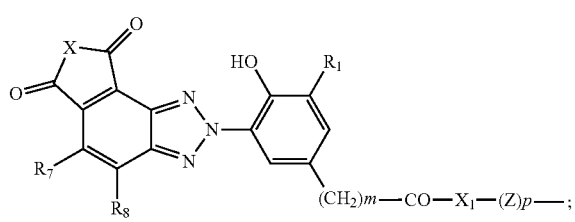

and

Z is selected from the group consisting of $C_2$-$C_{12}$ alkylene radicals, $C_3$-$C_{12}$ butenylene radicals, $C_3$-$C_{12}$ butynylene radicals, $C_3$-$C_{12}$ cyclohexylene radicals, $C_3$-$C_{12}$ phenylene radicals, wherein (i) the $C_2$-$C_{12}$ alkylene and the $C_4$-$C_{12}$ alkylene radicals are interrupted by one or more nitrogen atoms, oxygen atoms or a mixture thereof, and (ii) said radicals may be additionally substituted by an OH group or by a group selected from the group consisting of

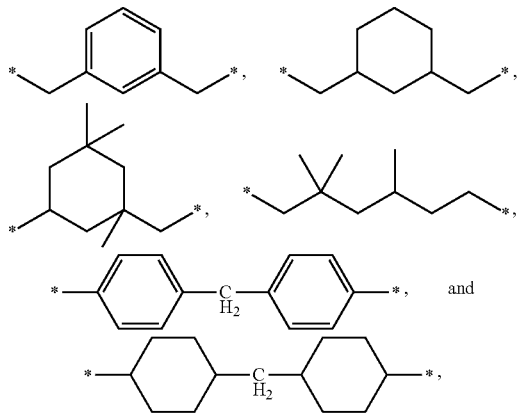

wherein * denotes a bond and, if Y is a direct bond, Z as well can also be a direct bond;

m is 0, 1 or 2, and p is 0 or 1, but is 0 if X and Y are each —N($R_{16}$)— and —N($R_{17}$)—, wherein $R_5$, $R_6$, $R_7$ and $R_8$ are each independently of one another selected from the group consisting of hydrogen, halogen, —CN, —NO$_2$ and —NH$_2$, X is selected from the group consisting of —O— and —NE$_1$—, wherein $E_1$ is selected from the group consisting of hydrogen, a branched or unbranched alkyl radical having 1 to 24 carbon atoms, a branched or unbranched alkenyl radical having 2 to 18 carbon atoms, a $C_2$-$C_6$ alkynyl, a $C_5$-$C_{12}$ cycloalkyl radical, a phenyl radical, a naphthyl radical, a $C_7$-$C_{15}$ phenylalkyl radical, a group of the formula

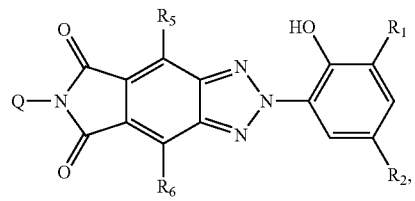

and a group of the formula

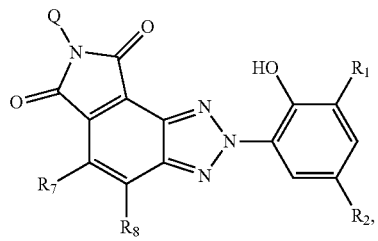

wherein, with respect to $E_1$, the $C_2$-$C_6$ alkynyl can be substituted by a group selected from the group consisting of —F, —OH, —OR$_{22}$, —NH$_2$, —NHR$_{22}$, —N(R$_{22}$)$_2$, —NHCOR$_{23}$, —NR$_{22}$COR$_{23}$, —OCOR$_{24}$, —COR$_{25}$, —SO$_2$R$_{26}$, —PO(R$_{27}$)$_n$(R$_{28}$)$_{2-n}$, —Si(R$_{29}$)$_n$ (R$_{30}$)$_{3-n}$, —Si(R$_{22}$)$_3$, —N$^+$(R$_{22}$)$_3$ A$^-$, —S$^+$(R$_{22}$)$_2$ A$^-$, -oxiranyl groups and mixtures thereof, or the branched or unbranched alkyl radical, branched or unbranched alkenyl radical, or the C$_2$-C$_6$ alkynyl can be interrupted by at least one selected from the group consisting of —O—, —S—, —NH— or —NR$_{22}$— groups and combinations thereof, or one or more of the phenyl, naphthyl and C$_7$-C$_{15}$ phenylalkyl radicals can also be substituted by at least one group selected from the group consisting of -halogen, —CN, —CF$_3$, —NO$_2$, —NHR$_{22}$, —N(R$_{22}$)$_2$, —SO$_2$R$_{26}$, —PO(R$_{27}$)$_n$(R$_{28}$)$_{2-n}$, —OH, —OR$_{22}$, —COR$_{25}$ and —R$_{25}$ radicals;

n is 0, 1 or 2;

R$_{22}$ is selected from the group consisting of a branched or unbranched alkyl radical having 1 to 18 carbon atoms, a branched or unbranched alkenyl radical having 2 to 18 carbon atoms, a C$_5$-C$_{10}$ cycloalkyl, a C$_5$-C$_{10}$ phenyl or a C$_5$-C$_{10}$ naphthyl, a C$_7$-C$_{15}$ phenylalkyl, and two R$_{22}$ radicals if adjacent to a nitrogen or silicon atom, and together with the atom to which they are connected can form a pyrrolidine, piperidine or morpholine ring;

R$_{23}$ has the same definition as R$_{22}$ or is selected from the group consisting of hydrogen, —OR$_{22}$, —NHR$_{22}$, and —N(R$_{22}$)$_2$, R$_{24}$ has the same definition as R$_{22}$ or is selected from the group consisting of —OR$_{22}$, —NHR$_{22}$, and —N(R$_{22}$)$_2$, R$_{25}$ has the same definition as R$_{22}$ or is selected from the group consisting of hydrogen, —OH, —OR$_{22}$, —NHR$_{22}$ and —N(R$_{22}$)$_2$, and —O-glycidyl, R$_{26}$ is at least one selected from the group consisting of —OH, —OR$_{22}$, —NHR$_{22}$ and —N(R$_{22}$)$_2$, R$_{27}$ is at least one selected from the group consisting of —NH$_2$, —NHR$_{22}$ and —N(R$_{22}$)$_2$, R$_{28}$ is at least one selected from the group consisting of —OH and —OR$_{22}$, R$_{29}$ is at least one of —Cl and —OR$_{22}$, R$_{30}$ is at least one selected from the group consisting of branched or unbranched C$_1$-C$_{18}$ alkyl, and Q is at least one selected from the group consisting of branched or unbranched C$_2$-C$_{12}$ alkylene, C$_2$-C$_{12}$ alkylene which is interrupted by one or more —O—, —NH— or —NR$_{14}$-atoms, C$_5$-C$_{10}$ cycloalkylene, para-phenylene and a group

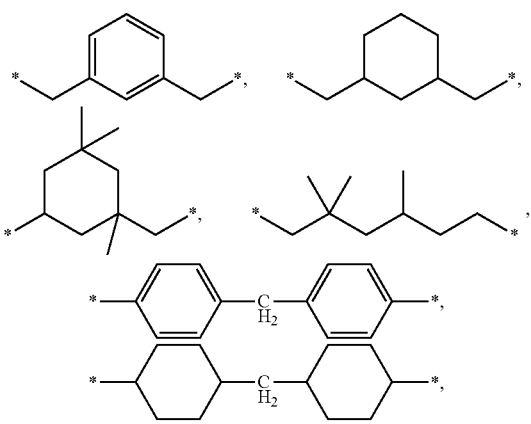

where * denotes a bond.

2. The multi-layered coating of claim 1, wherein at least one of the pigmented coating (P) and primer (G) comprise at least one UV absorber (UV1) having an absorption maximum of 370 nm to 450 nm.

3. The multilayered coating of claim 1, wherein the at least one UV absorber (UV1) is selected from the group consisting of formula (1b) and formula (2c)

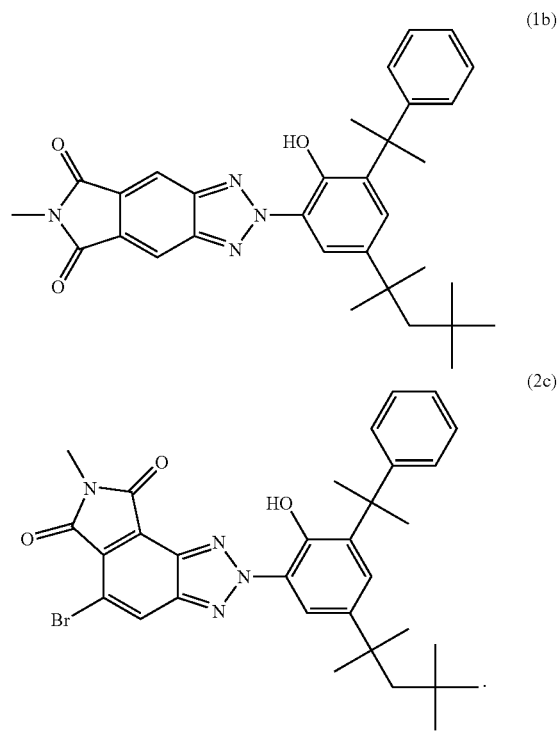

4. The multilayered coating of claim 1, wherein throughout the wavelength range of from 300 nm to 405 nm, the UV absorber (UV1) exhibits at least 50% of the absorption as compared with the absorption at the absorption maximum.

5. The multilayered coating of claim 4, wherein throughout the wavelength range of from 405 to 420 nm, the UV absorber (UV1) exhibits at least 10% of the absorption as compared with the absorption at the absorption maximum.

6. The multilayered coating of claim 1, wherein at least one of the pigmented coating (P) and primer (G) comprise at least one UV absorber (UV1) having an absorption maximum of greater than 380 nm up to 450 nm.

7. The multilayered coating of claim 6, wherein at least one of the pigmented coating (P) and the primer (G) comprise the UV absorber (UV1) having an absorption maximum of at least 370 nm in an amount of 0.1% to 30.0%, by weight, based on at least one of the solids content of the primer and the solids content of the pigmented coating, the further light stabilizers in an amount of 0 to 20.0%, by weight, based on at least one of the solids content of the primer and the solids content of the pigmented coating material.

8. The multilayered coating of claim 1, further comprising a transparent coating (K) disposed atop the pigmented coating (P).

9. The multilayered coating of claim 1, comprising a first pigmented coating (P1) disposed on the at least one primer (G), at least one second pigmented coating (P2) disposed on the first pigmented coating (P1), and a transparent coating (K) disposed atop the pigmented coating (P2).

10. The multilayered coating of claim 9, wherein at least one of the first pigmented coating (P1) and the second pigmented coating (P2), comprise the UV absorber (UV1).

11. The multilayered coating of claim 10, wherein the primer (G) comprises at least one electrophoretically deposited coating and wherein at least one of the pigmented coating (P1) and pigmented coating material (P2) comprises an aqueous pigmented coating material.

12. The multilayered coating of claim 11, wherein the pigmented coat (P2) comprises a sub-hiding coat thickness of 40% to 70% of a coat thickness which would be necessary to achieve hiding.

13. The multilayered coating of claim 9, wherein
the primer (G) comprises a dry film thickness of 8 to 60 μm;
the pigmented coating (P1) comprises a dry film thickness of 6 to 40 μm;
the pigmented coating (P2) comprises a dry film thickness of 3 to 40 μm; and
the transparent coating (K) comprises a dry film thickness of 8 to 80 μm.

14. A process for producing a multilayered coating, comprising:
applying at least one pigmented coating material (B) to an uncured or only part-cured or fully cured primer (G) to provide a pigmented coating (P),
applying at least one transparent coating material (T) to the pigmented coating (P), to produce a transparent coating (K),
wherein at least one of the pigmented coating (P) and the primer (G) comprise at least one UV absorber (UV1) having an absorption maximum of at least 370 nm and comprising at least one of formula (I) and formula (II),

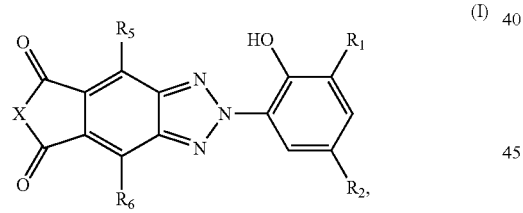
(I)

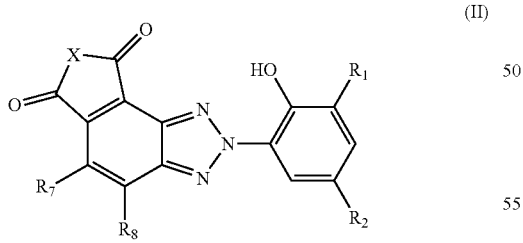
(II)

wherein
$R_1$ is selected from the group consisting of hydrogen, a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, a phenyl radical, a phenylalkyl radical substituted on a phenyl ring by 1 to 4 alkyl groups having 1 to 4 carbon atoms, a group of the formula

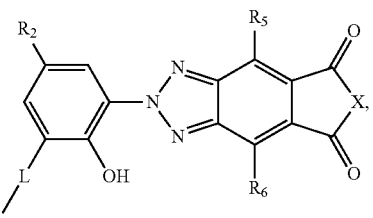

and a group of the formula

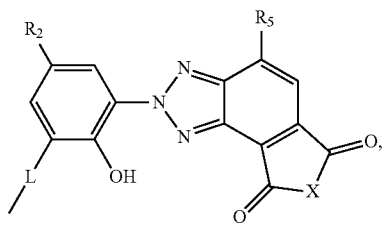

wherein
L comprises at least one divalent radical selected from the group consisting of an alkylene radical having 1 to 12 carbon atoms, an alkylidene radical having 2 to 12 carbon atoms, and a benzylidene radical, a p-xylene radical, and a cycloalkylene radical each having 5 to 7 carbon atoms;
$R_2$ is selected from the group consisting of a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, a phenyl radical, —$OR_{14}$, —$C(O)$—$O$—$R_{14}$, —$C(O)$—$NHR_{14}$, —$C(O)$—$NR_{14}R'_{14}$, (wherein $R'_{14}$ has the same definition as $R_{14}$), —$SR_{13}$, —$NHR_{13}$, —$N(R_{13})_2$, and —$(CH_2)_m$—$CO$—$X_1$-$(Z)_p$—$Y$—$R_{15}$,
wherein, with respect to $R_2$, (i) one or more of the phenyl and phenylalkyl radical can be substituted on the phenyl ring by 1 to 3 alkyl groups having 1 to 4 carbon atoms; (ii) the alkyl radical can be substituted by one or more groups selected from the group consisting of —OH, —OCO—$R_{11}$, —$OR_{14}$, —NCO, —$NH_2$, and mixtures thereof; (iii) one or more of the alkyl or alkenyl radical can be interrupted by one or more groups selected from the group consisting of —O—, —NH, —$NR_{14}$— and mixtures thereof; or (iv) one or more of the alkyl radical and alkenyl radical can be substituted by at least one of —OH, —$OR_{14}$, —$NH_2$, and mixtures thereof,
$R_{11}$ is selected from the group consisting of hydrogen, a branched or unbranched alkyl radical having 1 to 18 carbon atoms, a $C_5$-$C_{12}$ cycloalkyl radical, a branched or unbranched alkenyl radical having 3 to 8 carbon atoms, a phenyl radical, a naphthyl radical, and a $C_7$-$C_{15}$ phenylalkyl radical,
$R_{13}$ is at least one selected from the group consisting of alkyl having 1 to 20 carbon atoms, hydroxyalkyl having 2 to 20 carbon atoms, alkenyl having 3 to 18 carbon atoms, cycloalkyl having 5 to 12 carbon atoms, phenylalkyl having 7 to 15 carbon atoms, substituted or unsubstituted phenyl radical, and substituted or unsubstituted naphthyl radical, $R_{14}$ is selected from the group consisting of hydrogen, and a branched or unbranched alkyl radical having 1 to 24 carbon atoms, $X_1$ is selected from the group consisting of —O— and —N($R_{16}$)—, Y is selected from the group consisting of —O—, —N($R_{17}$)—, and a direct bond, $R_{15}$ is selected from the group consisting of hydrogen, $C_1$-$C_{12}$ alkyl,

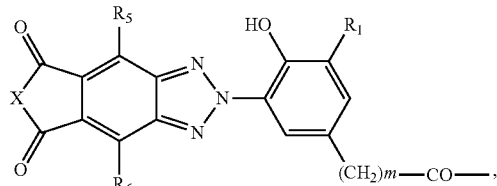

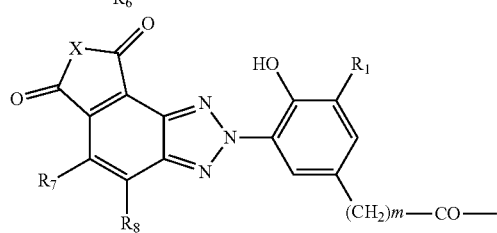

and —CO—C($R_{18}$)=C(H)$R_{19}$ or, if Y is —N($R_{17}$)—, $R_{15}$ forms together with $R_{17}$ a group —CO—CH=CH—CO—, $R_{16}$ and $R_{17}$ are independently of one another selected from the group consisting of hydrogen, $C_1$-$C_{12}$ alkyl, $C_3$-$C_{12}$ alkyl interrupted by 1 to 3 oxygen atoms, and cyclohexyl and $C_7$-$C_{15}$ phenylalkyl, and $R_{16}$ together with $R_{17}$ can also be ethylene if Z is ethylene;

$R_{18}$ is at least one of hydrogen and methyl, $R_{19}$ is selected from the group consisting of hydrogen, methyl and —CO—$X_1$—$R_{20}$, wherein $R_{20}$ is selected from the group consisting of hydrogen, $C_1$-$C_{12}$ alkyl, a group of the formula

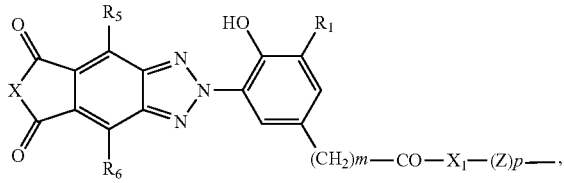

and a group of the formula

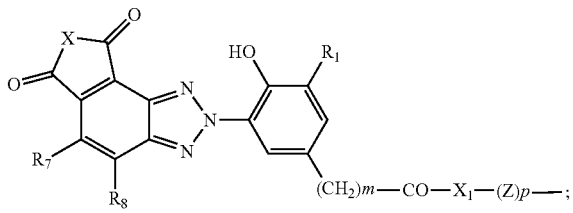

and

Z is selected from the group consisting of $C_2$-$C_{12}$ alkylene radicals, $C_3$-$C_{12}$ butenylene radicals, $C_3$-$C_{12}$ butynylene radicals, $C_3$-$C_{12}$ cyclohexylene radicals, $C_3$-$C_{12}$ phenylene radicals, wherein (i) the $C_2$-$C_{12}$ alkylene and the $C_4$-$C_{12}$ alkylene radicals are interrupted by one or more nitrogen atoms, oxygen atoms or a mixture thereof, and (ii) said radicals may be additionally substituted by an OH group or by a group selected from the group consisting of

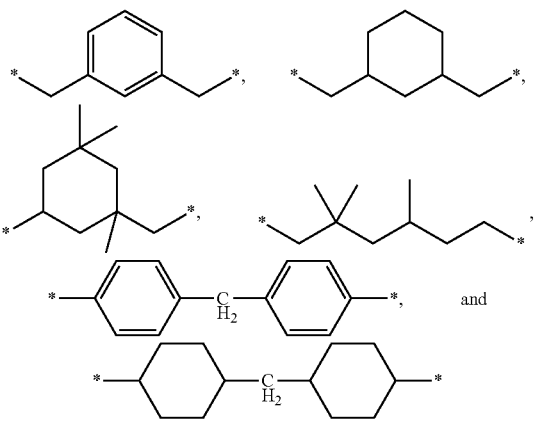

wherein * denotes a bond and, if Y is a direct bond, Z as well can also be a direct bond;

m is 0, 1 or 2, and p is 0 or 1, but is 0 if X and Y are each —N($R_{16}$)— and —N($R_{17}$)—, wherein $R_5$, $R_6$, $R_7$ and $R_8$ are each independently of one another selected from the group consisting of hydrogen, halogen, —CN, —NO$_2$ and —NH$_2$, X is selected from the group consisting of —O— and —NE$_1$—, wherein E$_1$ is selected from the group consisting of hydrogen, a branched or unbranched alkyl radical having 1 to 24 carbon atoms, a branched or unbranched alkenyl radical having 2 to 18 carbon atoms, a $C_2$-$C_6$ alkynyl, a $C_5$-$C_{12}$ cycloalkyl radical, a phenyl radical, a naphthyl radical, a $C_7$-$C_{15}$ phenylalkyl radical, a group of the formula

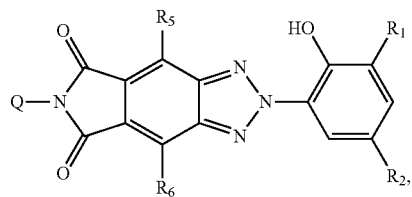

and a group of the formula

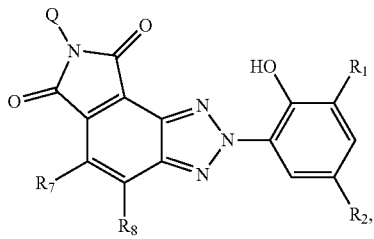

wherein, with respect to E$_1$, the $C_2$-$C_6$ alkynyl can be substituted by a group selected from the group consisting of —F, —OH, —OR$_{22}$, —NH$_2$, —NHR$_{22}$, —N(R$_{22}$)$_2$, —NHCOR$_{23}$, —NR$_{22}$COR$_{23}$, —OCOR$_{24}$, —COR$_{25}$, —SO$_2$R$_{26}$, —PO(R$_{27}$)$_n$(R$_{28}$)$_{2-n}$, —Si(R$_{29}$)$_n$ $-(R_{30})_{3-n}$, $-Si(R_{22})_3$, $-N^+(R_{22})_3$ $A^-$, $-S^+(R_{22})_2$ $A^-$, -oxiranyl groups and mixtures thereof, or the branched or unbranched alkyl radical, branched or unbranched alkenyl radical, or the $C_2$-$C_6$ alkynyl can be interrupted by at least one selected from the group consisting of $-O-$, $-S-$, $-NH-$ or $-NR_{22}-$ groups and combinations thereof, or one or more of the phenyl, naphthyl and $C_7$-$C_{15}$ phenylalkyl radicals can also be substituted by at least one group selected from the group consisting of -halogen, $-CN$, $-CF_3$, $-NO_2-$, $-NHR_{22}$, $-N(R_{22})_2$, $-SO_2R_{26}$, $-PO(R_{27})_n(R_{28})_{2-n}$, $-OH$, $-OR_{22}$, $-COR_{25}$ and $-R_{25}$ radicals;

n is 0, 1 or 2;

$R_{22}$ is selected from the group consisting of a branched or unbranched alkyl radical having 1 to 18 carbon atoms, a branched or unbranched alkenyl radical having 2 to 18 carbon atoms, a $C_5$-$C_{10}$ cycloalkyl, a $C_5$-$C_{10}$ phenyl or a $C_5$-$C_{10}$ naphthyl, a $C_7$-$C_{15}$ phenylalkyl, and two $R_{22}$ radicals if adjacent to a nitrogen or silicon atom, and together with the atom to which they are connected can form a pyrrolidine, piperidine or morpholine ring;

$R_{23}$ has the same definition as $R_{22}$ or is selected from the group consisting of hydrogen, $-OR_{22}$, $-NHR_{22}$, and $-N(R_{22})_2$, $R_{24}$ has the same definition as $R_{22}$ or is selected from the group consisting of $-OR_{22}$, $-NHR_{22}$, and $-N(R_{22})_2$, $R_{25}$ has the same definition as $R_{22}$ or is selected from the group consisting of hydrogen, $-OH$, $-OR_{22}$, $-NHR_{22}$ and $-N(R_{22})_2$, and $-O$-glycidyl, $R_{26}$ is at least one selected from the group consisting of $-OH$, $-OR_{22}$, $-NHR_{22}$ and $-N(R_{22})_2$, $R_{27}$ is at least one selected from the group consisting of $-NH_2$, $-NHR_{22}$ and $-N(R_{22})_2$, $R_{28}$ is at least one selected from the group consisting of $-OH$ and $-OR_{22}$, $R_{29}$ is at least one of $-Cl$ and $-OR_{22}$, $R_{30}$ is at least one selected from the group consisting of branched or unbranched $C_1$-$C_{18}$ alkyl, and Q is at least one selected from the group consisting of branched or unbranched $C_2$-$C_{12}$ alkylene, $C_2$-$C_{12}$ alkylene which is interrupted by one or more $-O-$, $-NH-$ or $-NR_{14}-$ atoms, $C_5$-$C_{10}$ cycloalkylene, para-phenylene and a group

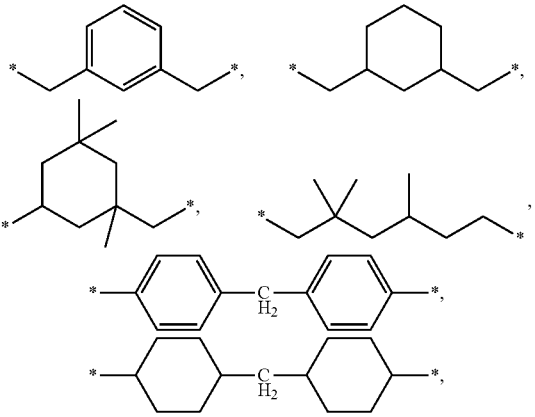

where * denotes a bond.

15. The process of claim 14, comprising:

applying to a surface of the primer (G) a first pigmented coating material (B1);

applying a second pigmented coating material (B2) to the pigmented coating material (B1);

applying a transparent coating material (T) to the pigmented coating material (B2); and jointly curing (B1), (B2), and (T), and, where appropriate, (G).

16. The process of claim 14, wherein the multilayer coating is at least one of an automotive OEM coating, a commercial-vehicle coating, a commercial vehicle refinish coating, an interior and exterior bodywork component coating, a marine coating, an aircraft coating, and a household and electrical appliance component coating.

17. A UV absorber (UV1) comprising at least one of formula (I) and formula (II),

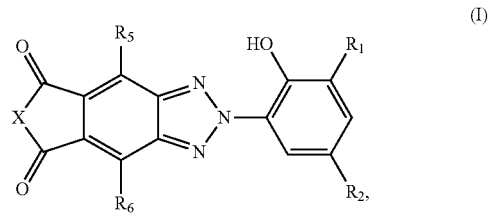

(I)

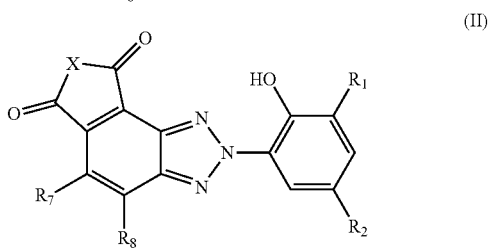

(II)

wherein $R_1$ is selected from the group consisting of hydrogen, a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, a phenyl radical, a phenylalkyl radical substituted on a phenyl ring by 1 to 4 alkyl groups having 1 to 4 carbon atoms, a group of the formula

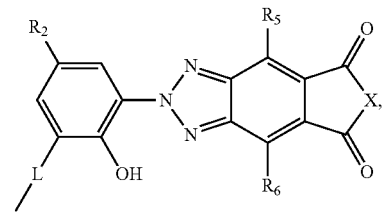

and a group of the formula

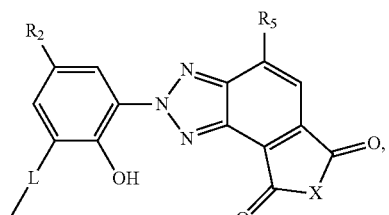

wherein

L comprises at least one divalent radical selected from the group consisting of an alkylene radical having 1 to 12 carbon atoms, an alkylidene radical having 2 to 12 carbon atoms, and a benzylidene radical, a p-xylene radical and a cycloalkylene radical each having 5 to 7 carbon atoms;

R$_2$ is selected from the group consisting of a branched or unbranched alkyl radical having 1 to 24 carbon atoms, a branched or unbranched alkenyl radical having 2 to 18 carbon atoms, a cycloalkyl radical having 5 to 12 carbon atoms, a phenylalkyl radical having 7 to 15 carbon atoms, a phenyl radical, —OR$_{14}$, —C(O)—O—R$_{14}$, —C(O)—NHR$_{14}$, —C(O)—NR$_{14}$R'$_{14}$, (wherein R'$_{14}$ has the same definition as R$_{14}$), —SR$_{13}$, —NHR$_{13}$, —N(R$_{13}$)$_2$, and —(CH$_2$)$_m$—CO—X$_1$-(Z)$_p$—Y—R$_{15}$, wherein, with respect to R$_2$, (i) one or more of the phenyl radical and the phenylalkyl radical can be substituted on the phenyl ring by 1 to 3 alkyl groups having 1 to 4 carbon atoms; (ii) the alkyl radical can be substituted by one or more groups selected from the group consisting of —OH, —OCO—R$_{11}$, —OR$_{14}$, —NCO, —NH$_2$, and mixtures thereof; (iii) one or more of the alkyl or alkenyl radical can be interrupted by one or more groups selected from the group consisting of —O—, —NH, —NR$_{14}$— and mixtures thereof; and (iv) one or more of the alkyl radical and alkenyl radical can be substituted by at least one of —OH, —OR$_{14}$, —NH$_2$, and mixtures thereof, R$_{11}$ is selected from the group consisting of hydrogen, a branched or unbranched alkyl radical having 1 to 18 carbon atoms, a C$_5$-C$_{12}$ cycloalkyl radical, a branched or unbranched alkenyl radical having 3 to 8 carbon atoms, a phenyl radical, a naphthyl radical, and a C$_7$-C$_{15}$ phenylalkyl radical, R$_{13}$ is at least one selected from the group consisting of alkyl having 1 to 20 carbon atoms, hydroxyalkyl having 2 to 20 carbon atoms, alkenyl having 3 to 18 carbon atoms, cycloalkyl having 5 to 12 carbon atoms, phenylalkyl having 7 to 15 carbon atoms, substituted or unsubstituted phenyl radical, and substituted or unsubstituted naphthyl radical, R$_{14}$ is selected from the group consisting of hydrogen, and a branched or unbranched alkyl radical having 1 to 24 carbon atoms, R$_{15}$ is selected from the group consisting of hydrogen, C$_1$-C$_{12}$ alkyl,

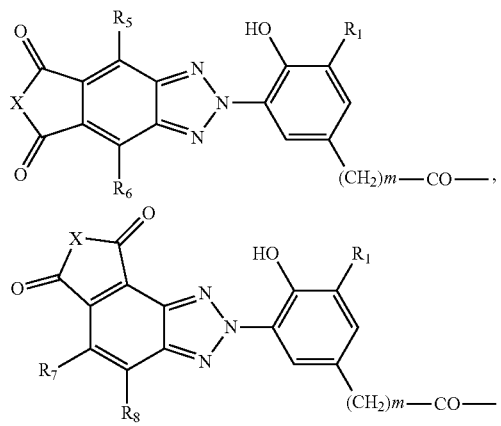

and —CO—C(R$_{18}$)=C(H)R$_{19}$ or, if Y is —N(R$_{17}$)—, R$_{15}$ forms together with R$_{17}$ a group —CO—CH=CH—CO—, R$_{18}$ is at least one of hydrogen and methyl, R$_{19}$ is selected from the group consisting of hydrogen, methyl and —CO—X$_1$—R$_{20}$, wherein R$_{20}$ is selected from the group consisting of hydrogen, C$_1$-C$_{12}$ alkyl, the group

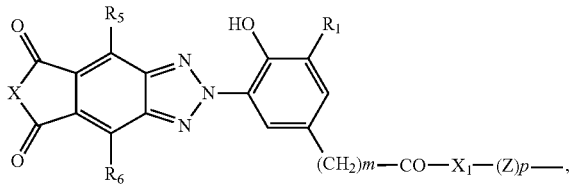

and the group

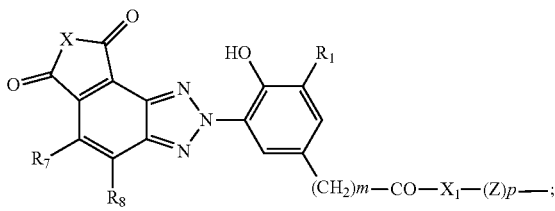

X$_1$ is selected from the group consisting of —O— and —N(R$_{16}$)—, Y is selected from the group consisting of —O—, —N(R$_{17}$)—, and a direct bond, R$_{16}$ and R$_{17}$ are independently of one another selected from the group consisting of hydrogen, C$_1$-C$_{12}$ alkyl, C$_3$-C$_{12}$ alkyl interrupted by 1 to 3 oxygen atoms, and cyclohexyl and C$_7$-C$_{15}$ phenylalkyl, and R$_{16}$ together with R$_{17}$ can also be ethylene if Z is ethylene;

Z is selected from the group consisting of C$_2$-C$_{12}$ alkylene radicals, C$_4$-C$_{12}$ alkylene radicals, C$_3$-C$_{12}$ alkylene radicals, C$_3$-C$_{12}$ butenylene radicals, C$_3$-C$_{12}$ butynylene radicals, C$_3$-C$_{12}$ cyclohexylene radicals, C$_3$-C$_{12}$ phenylene radicals, wherein (i) the C$_2$-C$_{12}$ alkylene and the C$_4$-C$_{12}$ alkylene radicals are interrupted by one or more nitrogen atoms, oxygen atoms or a mixture thereof, and (ii) said radicals may be additionally substituted by an OH group or by a group selected from the group consisting of

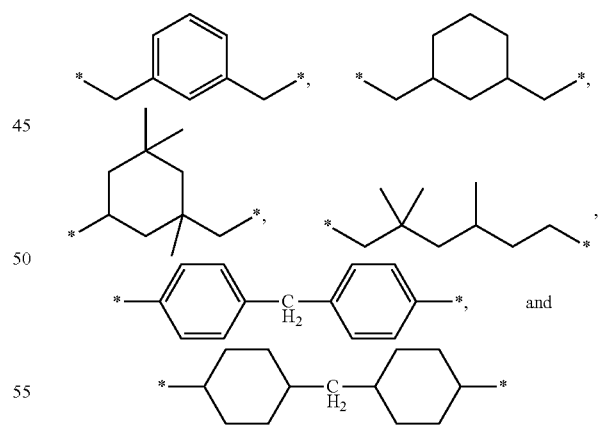

wherein * denotes a bond and, if Y is a direct bond, Z as well can also be a direct bond;

m is 0, 1 or 2, p is 0 or 1, but is 0 if X and Y are each —N(R$_{16}$)— and —N(R$_{17}$)—, wherein R$_5$, R$_6$, R$_7$ and R$_8$ are each independently of one another selected from the group consisting of hydrogen, halogen, —CN, —NO$_2$ and —NH$_2$, X is selected from the group consisting of —O— and —NE$_1$—, wherein E$_1$ is selected from the group consisting of hydrogen, a branched or unbranched alkyl radical having 1 to 24 carbon atoms, a branched or unbranched alkenyl radical having 2 to 18 carbon atoms, a $C_2$-$C_6$ alkynyl, a $C_5$-$C_{12}$ cycloalkyl radical, a phenyl radical, a naphthyl radical, a $C_7$-$C_{15}$ phenylalkyl radical, a group of the formula

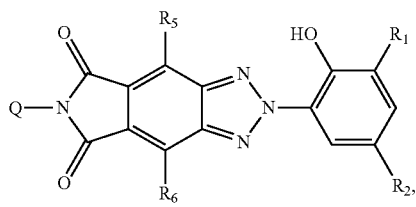

and a group of the formula

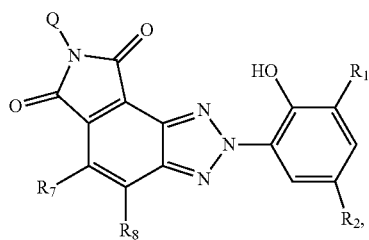

wherein, with respect to X, the $C_2$-$C_6$ alkynyl can be substituted by a group selected from the group consisting of —F, —OH, —OR$_{22}$, —NH$_2$, —NHR$_{22}$, —N(R$_{22}$)$_2$, —NHCOR$_{23}$, —NR$_{22}$COR$_{23}$, —OCOR$_{24}$, —COR$_{25}$, —SO$_2$R$_{26}$, —PO(R$_{27}$)$_n$(R$_{28}$)$_{2-n}$, —Si(R$_{29}$)$_n$(R$_{30}$)$_{3-n}$, —Si(R$_{22}$)$_3$, —N$^+$(R$_{22}$)$_3$ A$^-$, —S$^+$(R$_{22}$)$_2$ A$^-$, -oxiranyl groups and mixtures thereof, one or more of the branched or unbranched alkyl radical the branched or unbranched alkenyl radical, or the $C_2$-$C_6$ alkynyl can be interrupted by at least one selected from the group consisting of —O—, —S—, —NH— or —NR$_{22}$— groups and combinations thereof, and one or more of the phenyl, naphthyl and $C_7$-$C_{15}$ phenylalkyl radicals can also be substituted by at least one group selected from the group consisting of -halogen, —CN, —CF$_3$, —NO$_2$, —NHR$_{22}$, —N(R$_{22}$)$_2$, —SO$_2$R$_{26}$, —PO(R$_{27}$)$_n$(R$_{28}$)$_{2-n}$, —OH, —OR$_{22}$, —COR$_{25}$ and —R$_{25}$ radicals, n is 0, 1 or 2;

R$_{22}$ is at least one selected from the group consisting of a branched or unbranched alkyl radical having 1 to 18 carbon atoms, a branched or unbranched alkenyl radical having 2 to 18 carbon atoms, a $C_5$-$C_{10}$ cycloalkyl, a $C_5$-$C_{10}$ phenyl or a $C_5$-$C_{10}$ naphthyl, a $C_7$-$C_{15}$ phenylalkyl, and two R$_{22}$ radicals if adjacent to a nitrogen or silicon atom, and together with the atom to which they are connected can form a pyrrolidine, piperidine or morpholine ring;

R$_{23}$ has the same definition as R$_{22}$ or is selected from the group consisting of hydrogen, —OR$_{22}$, —NHR$_{22}$, and —N(R$_{22}$)$_2$, R$_{24}$ has the same definition as R$_{22}$ or is selected from the group consisting of —OR$_{22}$, —NHR$_{22}$, and —N(R$_{22}$)$_2$, R$_{25}$ has the same definition as R$_{22}$ or is selected from the group consisting of hydrogen, —OH, —OR$_{22}$, —NHR$_{22}$ and —N(R$_{22}$)$_2$, and —O-glycidyl, R$_{26}$ is at least one selected from the group consisting of —OH, —OR$_{22}$, —NHR$_{22}$ and —N(R$_{22}$)$_2$, R$_{27}$ is at least one selected from the group consisting of —NH$_2$, —NHR$_{22}$ and —N(R$_{22}$)$_2$, R$_{28}$ is at least one selected from the group consisting of —OH and —OR$_{22}$, R$_{29}$ is at least one of —Cl and —OR$_{22}$, R$_{30}$ is at least one selected from the group consisting of branched or unbranched $C_1$-$C_{18}$ alkyl, and Q is at least one selected from the group consisting of branched or unbranched $C_2$-$C_{12}$ alkylene, $C_2$-$C_{12}$ alkylene which is interrupted by one or more —O—, NH or NR$_{14}$ atoms, $C_5$-$C_{10}$ cycloalkylene, para-phenylene and a group

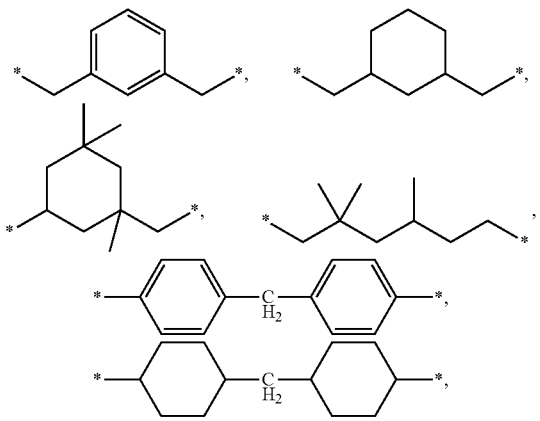

where * denotes a bond.

18. The UV absorber (UV1) of claim 17, wherein the UV absorber (UV1) is selected from the group consisting of formula (1b) and formula (2c)

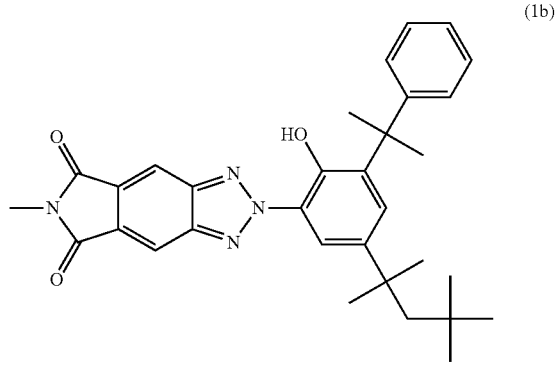

(1b)

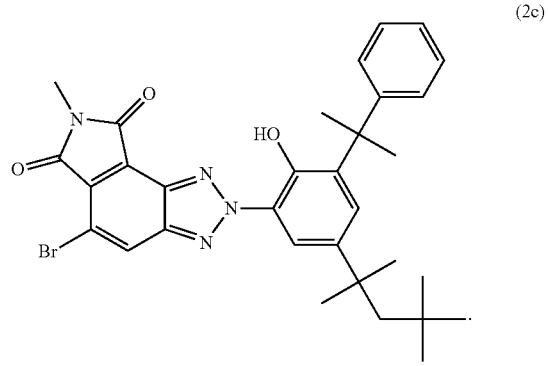

(2c)

* * * * *